(12) United States Patent
Shinjo et al.

(10) Patent No.: US 8,166,043 B2
(45) Date of Patent: Apr. 24, 2012

(54) BIT STRINGS SEARCH APPARATUS, SEARCH METHOD, AND PROGRAM

(75) Inventors: Toshio Shinjo, Chiba (JP); Koutaro Shinjo, legal representative, Chiba (JP); Mitsuhiro Kokubun, Chiba (JP)

(73) Assignee: S. Grants Co., Ltd., Chiba (JP)

( * ) Notice: Subject to any disclaimer, the term of this patent is extended or adjusted under 35 U.S.C. 154(b) by 0 days.

(21) Appl. No.: 12/926,424

(22) Filed: Nov. 17, 2010

(65) Prior Publication Data

US 2011/0066638 A1 Mar. 17, 2011

Related U.S. Application Data

(63) Continuation of application No. PCT/JP2009/000773, filed on Feb. 23, 2009.

(30) Foreign Application Priority Data

May 18, 2008 (JP) ................. 2008-130242

(51) Int. Cl.
G06F 7/00 (2006.01)
G06F 17/30 (2006.01)
(52) U.S. Cl. ...................... 707/745; 707/758
(58) Field of Classification Search .......... 707/745, 707/758
See application file for complete search history.

(56) References Cited

U.S. PATENT DOCUMENTS 6,675,163 B1 * 1/2004 Bass et al. ..................... 1/1

FOREIGN PATENT DOCUMENTS

| JP | 2001-14338 A | 1/2001 |
| JP | 2001-357070 A | 12/2001 |
| JP | 2003-296157 A | 10/2003 |
| JP | 2008-15872 A | 1/2008 |
| JP | 2008-112240 A | 5/2008 |

OTHER PUBLICATIONS

Nilsson, et al., "IP-Address Lookup Using LC-Tries", IEEE Journal on Selected Areas in Communications, vol. 17, No. 6, Jun. 1999, pp. 1083-1092.
Xin Li et al., "Stateful Inspection Firewall Session Table Processing," International Journal of Information Technology, vol. 11, No. 2, pp. 21-30, 2005.
International Search Report mailed on Jun. 16, 2009.

* cited by examiner

Primary Examiner — John E Breene
Assistant Examiner — Joshua Bullock
(74) Attorney, Agent, or Firm — Rader, Fishman & Grauer PLLC

(57) ABSTRACT

Using a tree configuration wherein node groups of four or more nodes composed of combinations of branch nodes, leaf nodes or empty nodes are linked into a tree form, a bit string search by a search key string is enabled by repeatedly linking to one of the nodes of a node group to which a primary node belongs in response to the bit values of keys of the search key string at the discrimination bit position included in the branch node.

16 Claims, 23 Drawing Sheets

BIT STRINGS SEARCH APPARATUS, SEARCH METHOD, AND PROGRAM

CROSS-REFERENCE TO RELATED APPLICATIONS

This application is a continuation of PCT/JP2009/000773 filed on Feb. 23, 2009, and is based on and claims the benefit of priority of the prior Japanese Patent Application No. 2008-130242, filed on May 18, 2008, the entire contents of which are incorporated herein by reference. The contents of PCT/JP2009/000773 are incorporated herein by reference in their entity.

BACKGROUND OF THE INVENTION

1. Field of the Invention

The present invention relates to a search method that searches for a desired bit string from a set of bit strings using a data structure in the form of a tree that holds bit strings, and more particularly to the search apparatuses, search methods, and their programs of the type using the coupled node trees disclosed in the patent publications JP 2008-015872 A and JP 2008-112240 A by this applicant.

2. Description of Related Art

In recent years, with advancements in information-based societies, large-scale databases have come to be used in various places. To search such large-scale databases, it is usual to search for a desired record, retrieving the desired record by using as indexes items within records associated with addresses at which each record is stored. Character strings in full-text searches can also be treated as index keys.

Because the index keys can be expressed as bit strings, the searching of a database is equivalent to searching for bit strings in the database. In order to perform the above-noted searching for bit strings at high speed, conventional art makes various refinements on the data structure in which bit strings are stored. One of these is a tree structure known as a Patricia tree.

FIG. 1 shows an example of a Patricia tree used for searching processing in the above-noted conventional art. A node of a Patricia tree is formed to include an index key, a test bit position for a search key, and right and left link pointers. Although it, is not explicitly shown, a node of course includes information for the purpose of accessing a record corresponding to the index key.

In the example shown in FIG. 1, the node 1750a that holds the index key "100010" is a root node, the test bit position 1730a of which is 0. The node 1750b is connected to the left link 1740a of the node 1750a, and the node 1750f is connected to the right link 1741a of the node 1750a. The index key held by the node 1750b is "010011," and the test bit position 1730b is 1. The node 1750c is connected to the left link 1740b of the node 1750b, and the node 1750d is connected to the right link 1741b of the node 1750b. The index key held by the node 1750c is "000111," and the test bit position is 3. The index key held by the node 1750d is "011010," and the test bit position is 2.

The parts connected to the node 1750c by a solid lines show the right and left link pointers of the node 1750c, and the left pointer 1740c that is not connected by the dotted line indicates that that field is blank. The dotted line connection destination of the right pointer 1741c that is connected by a dotted line expresses the address indicated by the pointer, and in this case this indicates that the right pointer points to the node 1750c. The right pointer 1741d of the node 1750d points to the node 1750d itself, and the node 1750e is connected to the left link 1740d. The index key held by 1750e is "010010," and the test bit position is 5. The left pointer 1740e of the node 1750e points to the node 1750b, and the right pointer 1741e of the node 1750e points to the node 1750e.

The index key held by the node 1750f is "101011," and the test bit position 1730f is 2. The node 1750g is connected to the left link 1740f of the node 1750f and the node 1750h is connected to the right link 1741f of the node 1750f. The index key held by the node 1750g is "100011," and the test bit position 1730g is 5. The left pointer 1740g of the node 1750g points to the node 1750a, and the right pointer 1741g of the node 1750g points to the node 1750g. The index key held by the node 1750h is "101100," and the test bit position 1730h is 3. The left pointer 1740h of the node 1750h points to the node 1750f, and the right pointer 1741h of the node 1750h points to the node 1750h.

In the example of FIG. 1, the configuration is such that, as the tree is traversed downward from the root node 1750a the test bit position of successive nodes increases. When a search is performed with some search key, the search keys' bit values corresponding to test bit positions held in nodes are successively tested from the root node, and a judgment is made as to whether the bit value at a test bit position is 1 or 0, the right link being followed if the bit value is 1, and the left link being followed if the bit value is 0. Unless the test bit position of a link target node is larger than the bit position of the link origin node, that is, if the link target is not below but rather returns upward (the returning links shown by the dotted lines in FIG. 16 being called back links), a comparison is performed between the index key of the link target and the search key. It is assured that if the result of the comparison is that the values are equal the search succeeds, but if the result is non-equal, the search fails.

As described above, although search processing using a Patricia tree has the advantages of being able to perform a search by testing only the required bits, and of it only being necessary to perform an overall key comparison one time, there are the disadvantages of an increase in storage capacity caused by the inevitable two links from each node, the added complexity of the decision processing because of the existence of back links, delay in the search processing by comparison with an index key for the first time by returning by a back link, and the difficulty of data maintenance such as adding and deleting a node.

In order to resolve these disadvantages of the Patricia tree, there is, for example, the technology disclosed in Patent Reference 1 below. In the Patricia tree described in Patent Reference 1 below, by storing lower level sibling nodes in a contiguous area, the space needed for pointers is reduced as well as by setting a bit in each node to show whether or not the next link is a back link the determination processing for back links is reduced. However, even in the disclosure of Patent Reference 1 below, since each node always reserves an area for the index key and the area for a pointer, and a single pointer is used for storing lower level sibling nodes in a contiguous area as shown for example even in the parts of left pointer 1740c, right pointer 1741h, etc. that are the lowest level parts of the Patricia shown in FIG. 17, the same amount of space must be allocated, etc., and there is not a very big space reduction effect. Also the problem of the delay in the search processing caused by a back links, and the difficulty of processing such as adding and deleting, etc., is not improved.

In order to resolve the problems in the above-noted conventional art, in the patent reference 2 below referring to patent application 2006-187827 the applicant proposed a bit string search method using a coupled node tree, which tree is a tree structure for bit string searches formed by a root node and a node pair stored in adjacent areas that is formed by a branch node and a leaf node, branch nodes, or leaf nodes; the root node showing the start point of the tree and being a leaf node if there is only one node in the tree and being a branch node if there are two or more nodes in the tree; the branch node including a discrimination bit position in the search key and information indicating a position of one node of a node pair of a link target; and the leaf node containing index keys that are the target bit strings of a bit string search. Patent reference 2 shows a method for creating a coupled node tree from a set of received index keys and basic search methods using a coupled node tree, such as methods for searching for a single index key from that coupled node tree, etc. Also, the configuration of the coupled node tree is uniquely stipulated by a set of index keys.

Also the bit string searches may also include various kinds of search requests, such as requests to find a minimum value or maximum value or searches for a value within a given range, etc. Regarding this point, this applicant proposed in the patent reference 3 below referring to patent application 2006-293619 methods, etc., of generalized searches for index keys, and of obtaining maximum/minimum values of index keys, and of extracting in ascending or descending order index keys included in any arbitrary subtree of a coupled node tree. A generalized search method, that is, a search with any arbitrary node in a coupled node tree as the search start node, is one that executes a search with a search key and whose object is an arbitrary subtree of the coupled node tree with the search start node as its root node. That search is performed by repeatedly linking to one of the nodes of a node pair of the link target in response to the bit value at the discrimination bit position of that key until the leaf node corresponding to that index key is reached and the index key included in that leaf node is obtained as the search result key.

The method to obtain the maximum/minimum value of the index keys is to link only to the primary node or the node paired with the primary node (hereinafter sometimes called the non-primary node) until a leaf node is reached, and, as described in Patent Reference 2, using the fact that the index keys in a coupled node tree are arranged in a sequential order, the method to extract the keys stored in a coupled node tree in ascending or descending order is to repeat a minimum value search or a maximum value search while updating the search start node based on that sequential order. Also, the above patent application disclosed that the coupled node tree is disposed in an array, and during the various search processings proposed in that patent application the array element number of the nodes on the search path from the search start node until a leaf node are successively stacked in a search path stack, and the processing uses the array element numbers stacked in the search path stack.

Patent document 1: Japanese Published Patent Application 2001-357070.

Patent document 2: Japanese Published Patent Application 2008-015872.

Patent document 3: Japanese Published Patent Application 2008-112240.

SUMMARY OF THE INVENTION

Also, this applicant proposed in Japanese patent application 2007-114915 a configuration of a coupled node tree wherein the leaf nodes hold information showing the position in the storage area wherein the index keys are stored instead the index keys themselves, and search processing using such a coupled node tree. Furthermore, this applicant proposed in Japanese patent application 2008-007690 a configuration of a coupled node tree wherein the coupled node tree exists for searching with a plurality of keys and searching is performed with a key string that has the condition that it is a straight-line concatenation of a plurality of keys and that its tail-end key is a unique key.

In a search using the coupled node tree proposed in the above Japanese patent application 2008-007690, since the processing is successively and serially applied to each of the key strings, as the number of keys forming a key string increase, so does the processing time increase.

Also, if the search is for a point whose position is expressed in a 2-dimensional coordinate like a point on a map, although the search is performed successively for the x coordinate and the y coordinate respectively, as the number of search objects on a map increase, the demand for improved search efficiency also increases.

Also, even if the search is for a point in a 3-dimensional space, the same situation applies.

Thus the purpose of this invention is to provide a tree configuration that enables that enables search processing that is a magnitude faster in a search with key strings composed of a plurality of keys and a search method that uses that configuration.

First, although the coupled node tree in accordance with this invention is the same as that proposed in the above noted patent application 2008-007690 and is used as the object of a search for a key string composed of a plurality of keys (hereinafter may be called a multiple dimension key), this tree differs from the tree proposed in patent application 2008-007690 in the point that the latter tree does not require the tail-end key to be unique. Also, although the tree configuration of the coupled node tree proposed in the above patent application was one wherein node pairs are linked in a tree form, conversely, in the tree configuration in accordance with this invention node groups of four or more nodes composed of combinations of branch nodes, leaf nodes or empty nodes are linked into a tree form. In this invention, a branch node includes a first position information that shows the position of a primary node, which is one node of the node group that is the link target, a leaf node either includes a second position information showing the position in a storage area that holds an index key composed of the bit string that is the target of searches or includes the index key itself, and an empty node includes information showing that an empty node is in the empty status.

With respect to the configuration proposed previously wherein nodes are composed of a primary node and a node paired with that primary node, each of the nodes of the node group of this invention are arranged in a position in accordance with the arrangement of the bit values of each key configuring its key string. In other words, the node group of this invention is an expansion of single dimension node pairs into multiple dimension, or multiple coupled nodes, and the coupled node tree (hereinafter this may be called a multiple coupled node tree) is an expansion into multiple dimensions of the previous single dimension coupled node tree. A search for a key string (hereinafter, this may be called a multiple dimension key or an index key) is realized by repeatedly linking to one of the nodes of a node group including a primary node in response to the bit value of each of the search key strings at the discrimination bit position included in a node.

In accordance with this invention, since linking is done to one of the nodes of a node group in response to the bit value of each of the search key strings, and since the branch processing of each of the keys does not occur serially and the branching hierarchy of the tree can be minimized, the efficiency of processing can be improved.

DESCRIPTION OF THE PREFERRED EMBODIMENT

Hereinafter an example of storing a coupled node tree in an array is described as a preferred embodiment for implementing this invention. Although it is possible to use address information in a storage device as the data indicating the position of a link target held by a branch node, by using an array formed by array elements that can store the larger of the occupied storage capacity area between a branch node and a leaf node, it is possible to express the node position as an array element number, enabling a reduction of the amount of position information for expressing the position of the primary node.

The explanation illustrates an example wherein the key strings are primarily composed of two keys. Thus the coupled node tree of this preferred embodiment may be called a double coupled node tree or just simply a tree. Also, the key strings (index keys) may be called two-dimensional keys. Furthermore, although the leaf nodes are described as including position information for the storage area holding an index key, the index keys can also be stored directly in the leaf nodes. However, as was described in the above-noted patent application 2007-114915, if the length of the index keys (in the case of the present application, key strings) becomes long, the index keys can be stored in a storage area instead of in the leaf nodes and their position information can be stored in the leaf nodes, thus using the storage area holding the nodes more efficiently.

Figure 1:
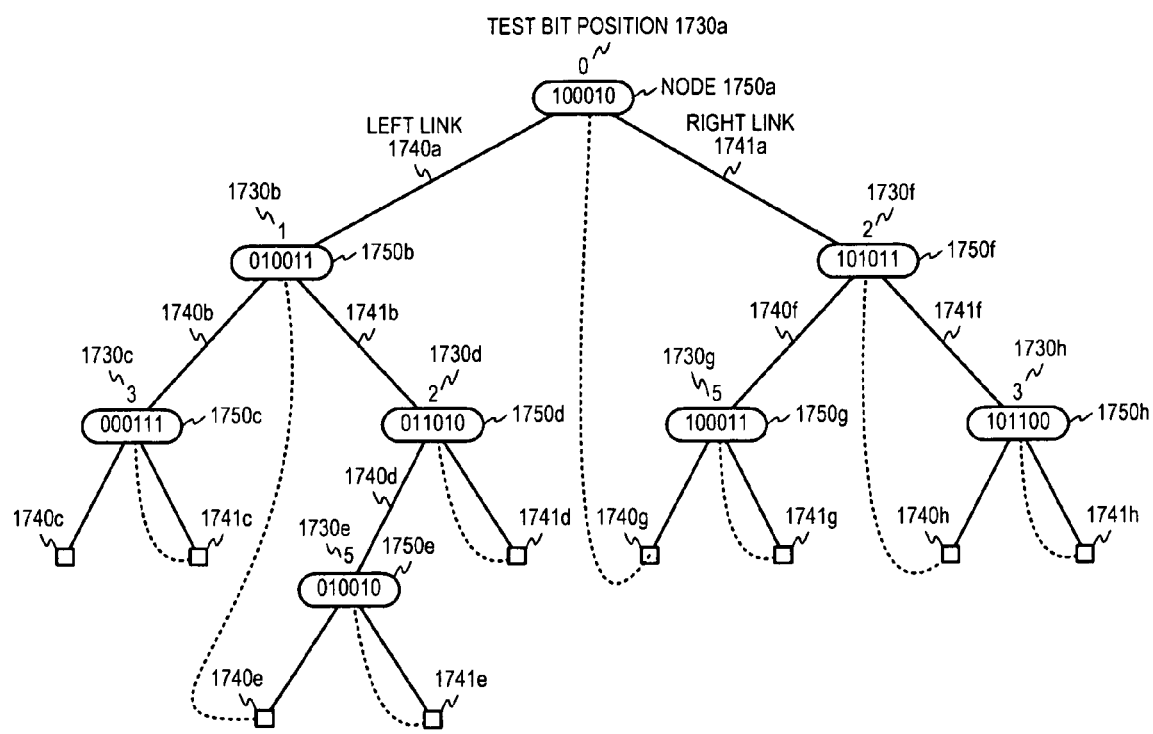
FIG. 1 is a drawing describing an example of a Patricia tree used in searching in the conventional art.
Figure 2A:
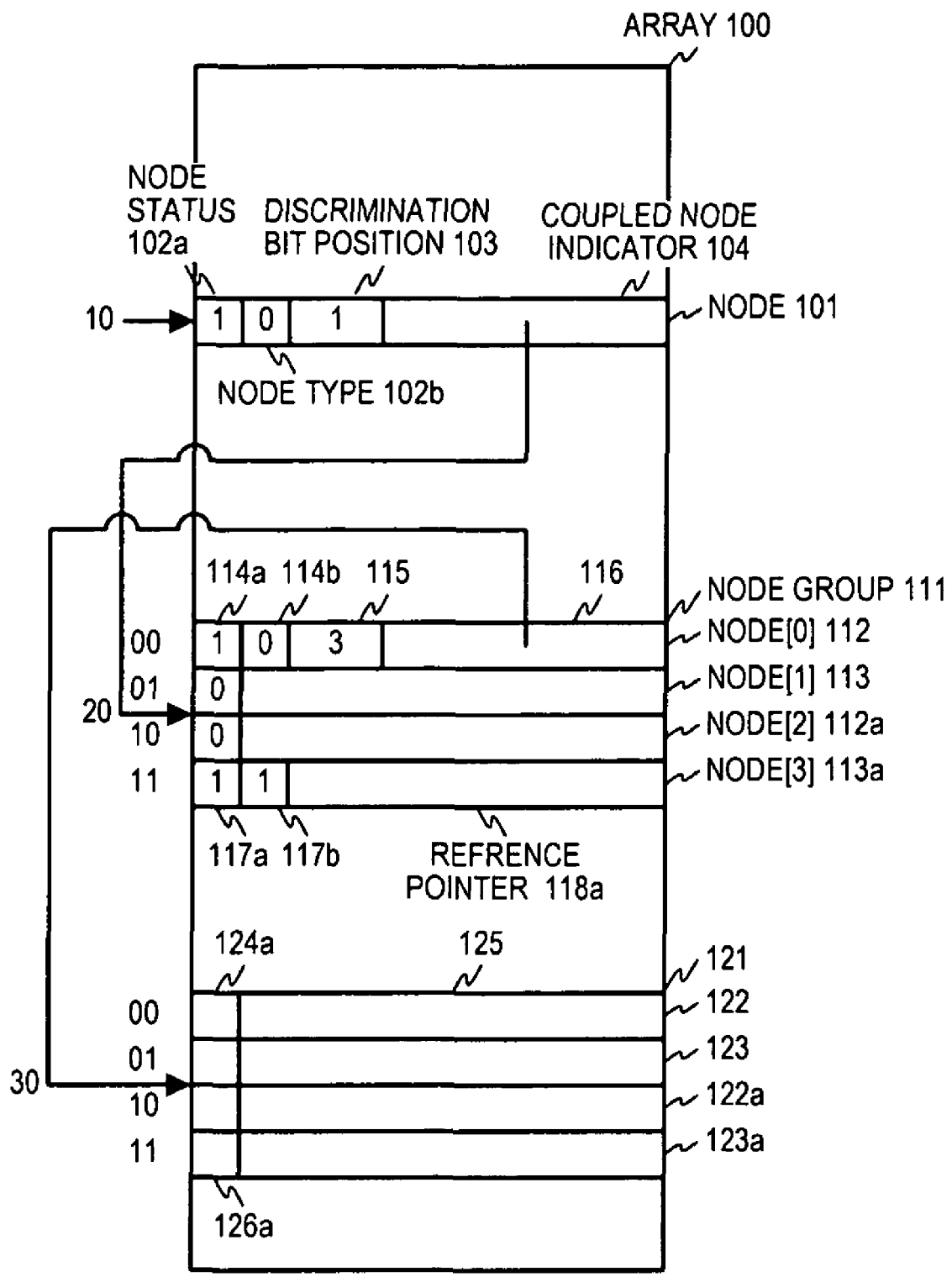
FIG. 2A is a drawing describing an exemplary configuration of a double coupled node tree stored in an array.

FIG. 2A is a drawing that describes an exemplary configuration of a double coupled node tree that is stored in an array in one embodiment of this invention. This drawing differs from the drawing proposed in the above noted patent application 2007-114915 in the point that each node includes node status information showing whether the node is an empty node or a node in use.

Since the nodes in a tree configuration of a coupled node tree in accordance with this invention are a node group configured from nodes arranged in a position corresponding to the arrangement of the bit values of each of the keys composing a multiple dimension key, when a multiple coupled node tree is generated in accordance with a set of multiple dimension keys, it is possible that a multiple dimension key corresponding to some node position in some node group may not exist. Thus, besides the node type, a node status is provided that identifies whether the node at that node position is empty or being used.

Referring to FIG. 2A, a node 101 is located at the array element of the array 100 with the array element number 10. The node 101 is formed by a node status 102a, a node type 102b, a discrimination bit position 103, and a coupled node indicator 104. The node status 102a is a 1, indicating that node 101 is being used. The node type 102b is 0, which indicates that the node 101 is a branch node. The value 1 is stored in the discrimination bit position 103. The coupled node indicator 104 has stored in it the array element number 20 of the primary node of the node group 111 of the link target. The array element number is a concrete example of the above noted first position information. To simplify notation hereinafter, the array element number stored in a coupled node indicator is sometimes called the coupled node indicator.

The array element with the array element number 20 has stored therein a node [0] 112, which is the primary node of the node pair 111. The node [1] 113 is stored into the next, adjacent, array element (array element number 20+1), node [2] 112a is stored into the next, adjacent, array element (array element number 20+2), and node [3] 113a is stored into the next, adjacent, array element (array element number 20+3).

Node [0] 112 is a branch node just like node 101. The value 1 is stored in the node status 114a of the node [0] 112, the value 0 is stored in the node type 114b, the value 3 is stored in the discrimination bit position 115, and the value 30 is stored in the coupled node indicator 116. The node statuses of node [1] 113 and node [2] 112a are both 0, indicating that they are empty nodes.

Node [3] 113a is composed of node status 117a, node type 117b, and reference pointer 118a. A "1" is stored in node status 117a and node type 117b, indicating that node [3] 113a is a leaf node. A pointer referencing the storage area for an index key is stored in the reference pointer 118a. The data store in reference pointer 118a is a concrete example of the above noted second position information.

To simplify notation hereinafter, the data stored in a reference pointer is sometimes called the reference pointer. In the same manner as in a Patricia tree described above, in order to access the record corresponding to an index key, access target information is naturally necessary. The correspondence between the index key and the access target information can be enabled, for example, by storing the access target information corresponding to an index key in a storage area adjacent to the storage area holding the index key. Hereinafter, description of the access target information is omitted.

The contents of the node group 121 formed by node 122, node 123, node 122a and node 123a that are stored in the array elements having array element number 30 are not shown.

The reference tags 00, 01, 10, and 11 appended respectively to the array elements holding node [0] 112, node [1] 113, node [2] 112a, node [3] 113, and to those holding node 122, node 123, node 122a, node 123a indicate the node position of each of those nodes in the node group in a binary representation. By adding the node position to the array element number holding the primary node, the array element number of the array element holding the node with that node position is obtained. Also, the primary node with the node position 00 is expressed as node [0], and the nodes with the node positions 01, 10, and 11 are expressed as node [1], node [2], and node [3] respectively. Also the node stored in an array element with some array element number is called the node of that array element number and the array element number stored in the array element of that node is also called the array element number of the node.

The node position indicates to which node of the node group a link is to be made when performing a search using a search key. In other words, linking is done to the node with the array element number computed by adding to the coupled node indicator the 2-bit value formed by the bit value at the discrimination bit position in the first key and the bit value at the discrimination bit position in the second key of the search key string.

Therefore, by adding the 2-bit value formed by the bit values at the branch node discrimination bit position in the first key and the second key of the search key string at the discrimination bit position of the search key to the coupled node indicator in the immediately previous branch node, it is possible to determine the array element number of an array element holding a node at the link target.

Also, although the above noted example used the smallest of the array element numbers assigned to a node group for the coupled node indicator, it is clear that the largest of the array element numbers could also be used. And it is clear that the node position of the primary node can be freely decided to be an arbitrary position.

Figure 2B:
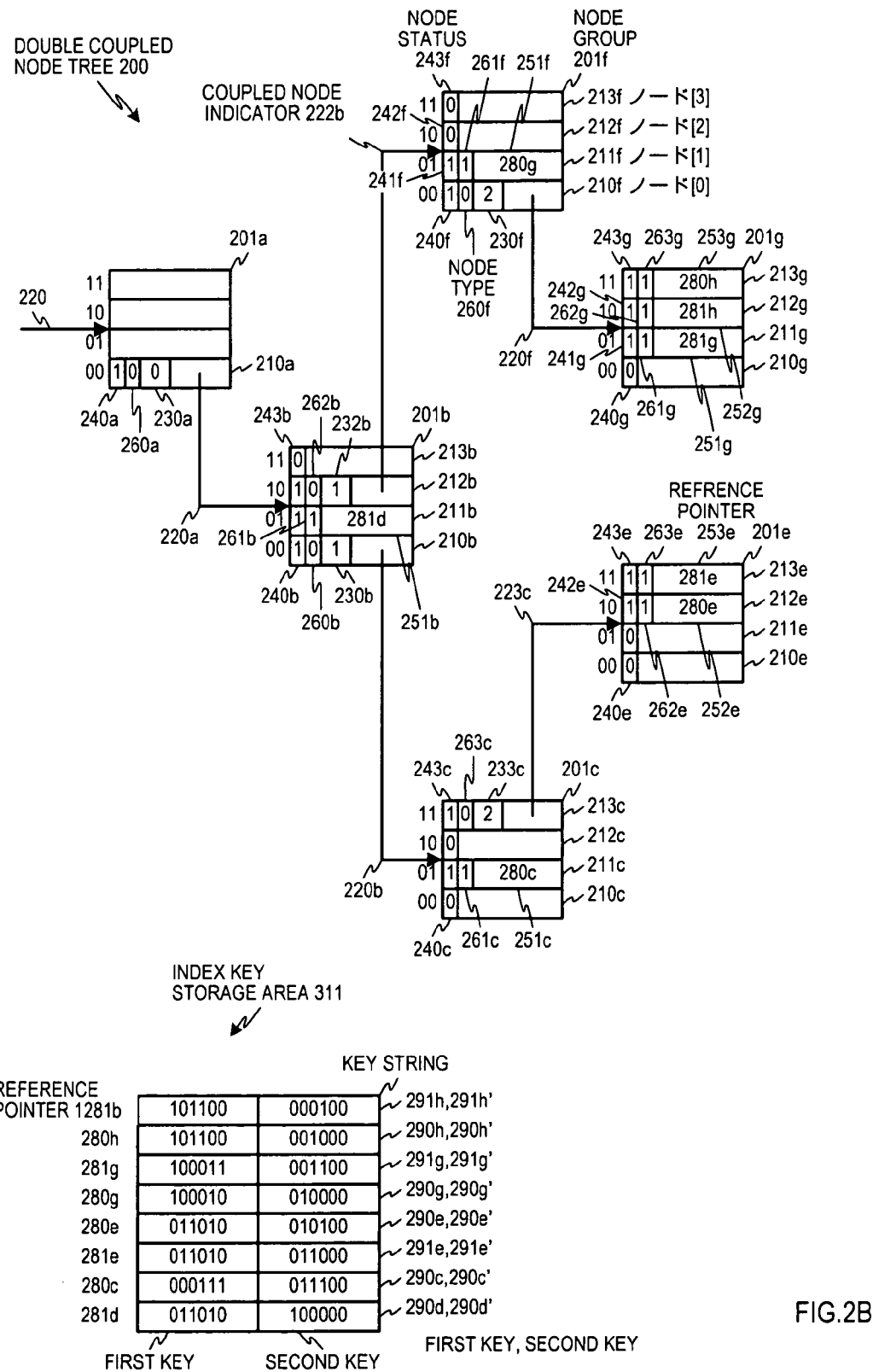
FIG. 2B is a drawing describing conceptually a tree structure of a double coupled node tree.

FIG. 2B is a drawing that conceptually shows an embodiment of a tree structure of a double coupled node tree and the storage area for 2-dimension keys (index keys). In FIG. 2B are shown the tree configuration of a double coupled node tree 200 and index key storage area 311. The object with the reference tag 210a is the root node. In the illustrated example, the root node 210a is the primary node of the node group 201a located at array element number 220.

In this tree configuration, a node group 201b is located below the root node 210a, and below that are located the node group 201c and the node group 201f. Below the node group 201f is located the node group 201g. Below the node pair 201c is located the node group 201e.

The reference tags 00, 01, 10, and 11 affixed before each of the nodes are the same as the reference codes affixed before the array element described in FIG. 2A and they indicate the node position. The tree is traversed in accordance with the bit values at the discrimination bit position in each key of the search key string, so that the leaf node that corresponds to the index key that is the object of the search is found.

In the example shown in the drawing, the node status 240a of the root node 210a has a 1 and the node type 260a has a 0, indicating a branch node, and the discrimination bit position 230a shows a 0. The coupled node indicator is 220a, which is the array element number of the array element in which the primary node 210b of the node group 201b is stored.

The node pair 201b is formed by the nodes 210b, 211b, 212b and 213b. Only the node status 243b of node 213b which has node position 11 is a 0, indicating that it is an empty node. The fact that the node with the node position 11 is an empty node reflects the fact that a 2-dimension key with a 1 in both bit values in the first key and the second key for the value 0 stored in the discrimination bit position 230a in the upper level branch node 210a does not exist in the index key storage area 311.

The node status of node 210b is a 1 and the node statuses of node 211b and node 212b are also a 1, just like the node status 240b of node 210b, indicating that they are in use. Of these nodes, the node types 260b and 262b of nodes 210b and 212b are both 0, indicating that they are branch nodes. The discrimination bit position 230b of the node 210b has 1 stored therein, and in the coupled node indicator of the link target is stored the array element number 220b of the array element in which is stored the primary node 210c of the node group 201c.

The discrimination bit position 232b of the node 212b has 1 stored therein, and in the coupled node indicator of the link target is stored the array element number 222b of the array element in which is stored the primary node 210f of the node group 201f.

Also, because the node type 261b of node 211b is a 1, indicating a leaf node, it includes the reference pointer 251b. In the reference pointer 251b is stored the reference pointer 281d pointing to the storage area holding the key string (2 dimension key) with the first key 291d value of "011010" and the second key 291d' value of "100000". The data stored in the reference pointer 251b is also sometimes called the reference pointer and is indicated with the reference tag 281d. The same applies to other leaf nodes: both reference pointers and the data in the reference pointer are sometimes expressed with the word reference pointer. Also, in the description below, the expressions "011010:100000" or 291d and 291d' are sometimes used for the 2 dimension key.

The fact that the leaf node 211*b* holding reference pointer 281*d* in node position 01 of node group 201*b* exists corresponds to the fact that the bit values at bit position 0 shown by discrimination bit position 230*a* of the branch node 210*a* immediately above the node group 210*b* are the value 0 in the first key 290*d* and the value 1 in the second key 290*d'* in the index key referenced by the reference pointer 281*d* and no other index key exists with this kind of bit value arrangement.

Also, the fact that the nodes in node group 201*b* at node positions 00 and 10 are branch nodes corresponds to the fact that 2 or more index keys have an arrangement of bit values of 00 and 10 in the first key and the second key at the bit position indicated by the discrimination bit position 230*a* of branch node 210*a*, and those index keys can be discriminated by the bit values in bit positions lower that bit position 0.

Because a 0 is stored in the node status 240*c* of node 210*c* that is the link target of branch node 210*b*, this node is an empty node, and the node status of node 212*c* whose node position is 10 is also 0 and it too is an empty node. The node status of node 211*c* whose node position is 01 is 1 and its node type 261*c* is a 1, indicating that node 211*c* is a leaf node. Thus it includes reference pointer 251*c*. In the example shown, reference pointer 251*c* holds the pointer 280*c* referencing the storage area holding the 2 dimension key formed from the first key 290*c* and the second key 290*c'*.

The first key 290*c* of the entry pointed to by the index storage area 311 reference pointer 280*c* holds "000111" and the second key 290*c'* holds "011100". The first key 290*c* has a "0" at the bit position 1 indicated by the discrimination bit position 230*b* of the branch node 210*b* immediately above node group 201*c*, and the second key 290*c'* has a "1" at the same position. Just as was described for leaf node 211*b*, the fact that there is no other index key with this combination of bit values corresponds to the fact that leaf node 211*c* holding reference pointer 280*c* is stored in node position 01 in node group 201*c*.

Because the node status 243*c* of node 213*c* at node position 11 is a 1 and its node type 263*c* is a 0, node 213*c* is a branch node. Its discrimination bit position 233*c* is a 2, and its coupled node indicator holds the array element number 223*c* of the array element holding primary node 210*e* of node group 201*e*.

Because the node status 240*e* of node 210*e* with the node position 00 in node group 201*e* is 0, it is an empty node, and in the same way node 211*e* with the node position 01 is an empty node.

The node statuses 242*e* and 243*e* of nodes 212*e* and 213*e* with node positions 10 and 11 are both 1 and the node types 260*e* and 261*e* are both 1, indicating that both are leaf nodes. In the reference pointers 252*e* and 253*e* are stored the reference pointers 280*e* and 281*e* respectively, which in turn reference the storage area holding the key strings 290*e* and 290*e'*with the value "011010:010100", and key strings 291*e* and 291*e'*with the value "011010:011000" respectively.

The node status 240*f* of node 210*f* which is the primary node of the node group 201*f* that is the link target of the branch node 212*b* in node group 201*b* is 1 and the node status 241*f* of node 211*f* with the node position 01 is also 1. The node type 260*f* of node 210*f* is 0, indicating node 210*f* is a branch node. The discrimination bit position 230*f* has a 2 stored therein. The array element number 220*f* of the array element holding the primary node 210*g* of the node group 201*g* is stored in the coupled node indicator of node 210*f*. The node type 261*f* of node 211*f* is a 1, indicating that node 211 is a leaf node. In the reference pointer 251*f* of node 211*f* is stored the reference pointer 280*g*, pointing to the storage area holding the key strings 290*g* and 290*g'*with the value "100010:010000".

The node status 243*f* of node 213*f* with node position 11 is 0, indicating an empty node, and because the node status 242*f* of node 212*f* is also a 0, it is an empty node.

The node status [240*g*] of node 210*g* with node position 00 which is the link target of branch node 210*f* is 0, indicating that node 210*g* is an empty node. The node statuses 241*g*, 242*g* and 243*g* of nodes 211*g*, 212*g* and 213*g* with node positions 01, 10 and 11 are 1, and their node types 261*g*, 262*g* and 263*g* are 1, indicating that nodes 211*g*, 212*g* and 213*g* are leaf nodes. In the respective reference pointers 251*g*, 252*g* and 253*g* of nodes 211*g*, 212*g* and 213*g* are stored reference pointer 281*g* pointing to the storage area holding the key strings 291*g* and 291*g'* with the value "100011:001100", reference pointer 281*h* pointing to the storage area holding the key strings 291*h* and 291*h'* with the value "101100:000100" and reference pointer 280*h* pointing to the storage area holding the key strings 290*h* and 290*h'*with the value "101100: 001000".

Although FIG. 2B shows an example of the storage area for multiple index keys being laid out contiguously and this contiguous storage area altogether is expressed as the index key storage area 311, the index keys need not be stored in a contiguous area. Also the relation between the various leaf nodes in the tree structure and the disposition sequence of the index keys in the index key are 311 can be completely unrelated.

The processing flow in searching for the 2-dimension key (index key) formed from the first key "101100" and the second key "001000" in the above-noted tree is briefly described below. The discrimination bit positions are numbered 0, 1, 2, . . . and so on from the left. First, processing is started from the root node 201*a* using the bit string formed from the first key "101100" and the second key "001000" as the search key. Because the discrimination bit position 230*a* is 0, examining the bit values at the discrimination bit position 0 of the first key "101100" and the second key "001000" of the search key reveals a 1 and a 0 respectively. This being the case, linking is done to the node 212*b* with node position 10, stored in the array element with the array element number calculated by adding a "10" in binary representation, that is, 2, to the array element number 220*a* stored in the coupled node indicator.

Next, because a 1 is stored in the discrimination bit position 232*b* of node 212*b* and examining the bit values at the discrimination bit position 1 of the first key "101100" and the second key "001000" of the search key reveals a 0 and a 0 respectively, linking is done the node 210*f* stored in the array element with array element number 222*b* stored in the primary node.

A 2 is stored in the discrimination bit position 230*f* of node 210*f* and examining the bit values at the discrimination bit position 2 of the first key "101100" and the second key "001000" of the search key reveals a 1 and a 1 respectively. This being the case, linking is done to the node 213*g* with node position 11, stored in the array element with the array element number calculated by adding a "11" in binary representation, that is, 3, to the array element number 220*f* stored in the coupled node indicator.

Because the node type 263*g* of node 213*g* is a 1, indicating a leaf node, the storage area indicated by the reference pointer 280*h* is referenced and the index keys 290*h* and 290*h'*stored there are read out. When the read-out index keys are compared with the search keys, in the case of the above example, it can be understood that they match.

Next, the significance of the configuration of the coupled node tree will be described, with reference made to FIG. 2B.

The configuration of the coupled node tree is stipulated by a set of index keys. In the example of FIG. 2B, the fact that the discrimination bit position 230*a* of the root node 210*a* is 0 reflects the fact that there is a difference in the arrangement of the 0-th bits in the first key and second key forming the index keys. The group of index keys whose bit arrangement at the 0-th bit of the first and second keys is 00 are disposed under node 210*b* with the node position 00, the group of index keys whose bit arrangement at the 0-th bit of the first and second keys is 01 are disposed under node 211*b* with the node position 01, the group of index keys whose bit arrangement at the 0-th bit of the first and second keys is 10 are disposed under node 212*b* with the node position 10, and the group of index keys whose bit arrangement at the 0-th bit of the first and second keys is 11 are disposed under node 213*b* with the node position 11. As was noted previously, because index keys with the arrangement 11 at the 0-th bit of the first and second keys do not exist, node 213*b* is empty. Also the fact that node 211*b* with node position 01 is a leaf node corresponds to the fact that no other index key has the same arrangement 01 for bit values at the 0-th position and there is no need to discriminate between index keys at bit positions below the 0-th bit position.

The fact that the discrimination bit position 230*b* of node 210*b* is 1 reflects a property of a set of index keys that coincide at all values higher than bit 1 of the first and second keys of the index keys associated with the lower level leaf nodes 211*c*, 212*e* and 213*e* (all of their arrangements at the 0-th bit is 00) and they differ in their arrangements at bit 1.

In the same way, the fact that the discrimination bit position 232*b* of node 212*b* is 1 reflects a property of a set of index keys that coincide at all values higher than bit 1 of the first and second keys of the index keys associated with the lower level leaf nodes 211*f*, 211*g*, 212*g* and 213*g* (all of their arrangements at the 0-th bit is 10) and they differ in their arrangements at bit 1.

This reflection of the property of a set of index keys is the same for the node groups 201*c*, 201*e*, 201*f* and 201*g*

Even in the event that the index key set includes the index key formed from the first key 291*h* "101001" and second key 291*h*' "000001" in place of the index key formed from the first key 291*h* "101100" and second key 291*h*' "000100", because there is equality up until bit 2 of both their first and the second keys, only the index key stored in the storage area expressed by reference pointer 281*h* for node 212*g* would change, there being no change in the structure of the tree itself. However, if the index key formed from the first key "101100" and second key "000000" is included in addition to the index key formed from the first key 291*h* "101001" and second key 291*h*' "000001", the node 212*g* would become a branch node, the discrimination bit position thereof being 3, and the leaf node related to that index key would be disposed in node position 10 of the node group that is the link target of node 212*g*.

As shown above, because the configuration of a coupled node tree reflects the property of a set of index keys, no node group exists with only one node being in-use. Because nodes arranged in the node positions of a node group are mutually distinguished by the arrangement of bit values at the discrimination bit position of the branch node immediately higher, a mutually distinguished partner node exists. Thus it is not possible that there be only 1 node in-use.

For example, in the tree shown in FIG. 2B, even if the index key pointed to by the reference pointer 280*e* of node 212*e* did not exist in the index key storage area 311, node 212*e* will be empty and if only node 213*e* is made in-use in node group 201*e*, the index key pointed to by reference pointer 281*e* of leaf node 213*c* need not be distinguished by the bit value at the bit position 2 stored in the discrimination bit position 233*c* of branch node 213*c*. Instead, the index key pointed to by reference pointer 280*c* of leaf node 213*c* would be distinguished by the arrangement 11 of the bit values at bit position 1 stored in the discrimination bit position 230*b* of branch node 210*b*. In other words, leaf node 213*e* would be arranged in node position 11 of node group 201*c*, and the nodes of node group 201*e* become all empty, and node group 201*e* would no longer exist in the tree.

Also, even in the case that node 211*f* is an empty node, branch node 210*f* would be arranged in node position 212*b* of node group 201*b*, and node group 201*f* would become unnecessary and would be deleted.

As described above, the coupled node tree structure is determined by the bit values of each bit position of the index keys included in the set of index keys.

When searching using a search key string, the index key is followed over a path disposed on a coupled node tree, and in the case, for example of a search key string "101100:000100" it is possible to reach the node 212*g* in the tree shown in FIG. 2B. As can be imagined from the above-noted description, even if the search key is made "101000:000001", the node 212*g* will be reached, and the index key stored in the storage area expressed by the reference pointer 281*h* will be obtained as the search result key string.

In this way, branching is performed using a discrimination bit position in accordance with the bit configuration of each key in the index keys (key strings) stored in a coupled node tree.

Figure 3:
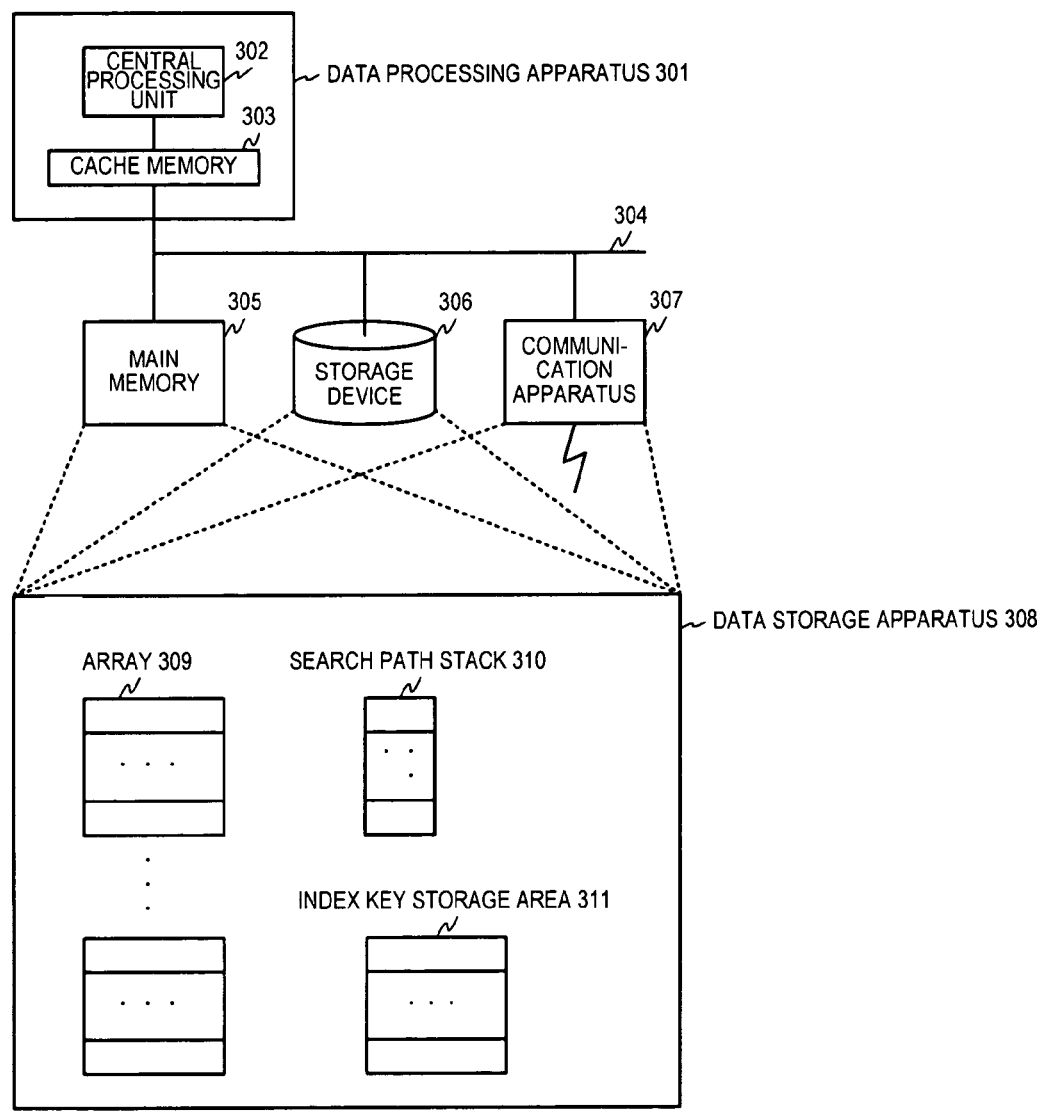
FIG. 3 is a drawing describing an exemplary hardware configuration for embodying the present invention.

FIG. 3 is a drawing describing an example of a hardware configuration for embodying the present invention.

Search processing and data maintenance are implemented with the searching apparatus of the present invention by a data processing apparatus 301 having at least a central processing unit 302 and a cache memory 303, and a data storage apparatus 308. The data storage apparatus 308, which has an array 309 into which is disposed a coupled node tree, and a search path stack 310, into which are stored array element numbers of nodes which are traversed during the search, can be implemented by a main memory 305 or a storage device 306, or alternatively, by using a remotely disposed apparatus connected via a communication apparatus 307. The array 100 in FIG. 2A is one embodiment of the array 309. Also, just as in FIG. 2B, the index key storage area 311 is shown as a contiguous area, but it is, of course, allowed to be a non-contiguous area. Furthermore, although the description makes the array element numbers of the array elements holding the nodes traversed during a search to be stored in search path stack 310 in order to describe the coupled node tree as being disposed in an array, typically, information showing the node position with an address, or the like, of the memory area holding the node is stored.

In the example shown in FIG. 3, although the main memory 305, the storage device 306, and the communication apparatus 307 are connected to the data processing apparatus 301 by a single bus 304, there is no restriction to this connection method. The main memory 305 can be disposed within the data processing apparatus 301, and can be implemented as hardware within the central processing unit 302. It will be understood that it is alternatively possible to select appropriate hardware elements in accordance with the usable hardware environment and the size of the index key set, for example, having the array 309 held in the storage device 306 and having the search path stack 310 held in the main memory 305.

Also, although it is not particularly illustrated, a temporary memory area can of course be used to enable various values obtained during processing to be used in subsequent processing. In the description below, just as for the search key start position noted earlier, the value set or stored in a temporary memory area may be called by the name of that temporary memory area.

As shown the example in FIG. 3, the array 309 consisting of the array elements holding the nodes of the coupled node tree and the index key storage area 311 are separate areas. Thus compared to the case wherein the index keys are included in the array elements holding leaf nodes, the amount of storage needed for each array element in the configuration of FIG. 3 typically is smaller. In other words, by separating the index key storage area 311 from the array 309 holding the coupled node tree, more nodes can be contained in each cache block when the coupled node tree is read into the cache memory 303. As a result, in the search processing and so forth described later the frequency of cache misses is reduced and faster processing is enabled.

Next, details of the basic operations using the coupled node tree related to a preferred embodiment of this invention, the operations of searching, inserting, and deleting, are described successively.

Figure 4:
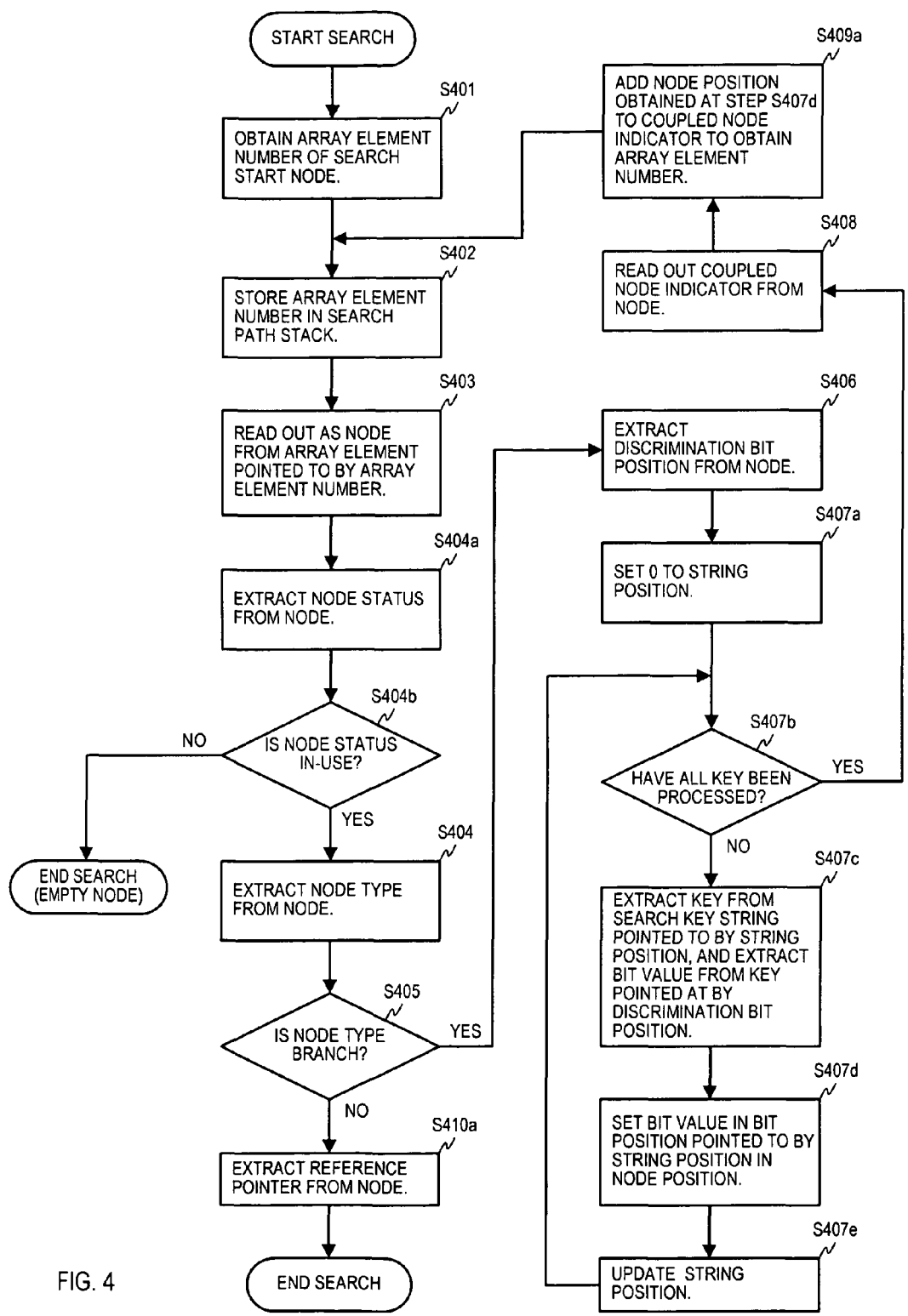
FIG. 4 is a flowchart showing search processing in an embodiment of the present invention.

FIG. 4 is a flowchart showing bit string search processing in an embodiment of the present invention. It assumes that a search key string has been received.

First, in step S401, a search start node is set. Setting the search start node is done by specifying or obtaining an array element number of the search start node and setting that array element number or the node related to that array element number in an unshown search start node setting area. Also, this search start node setting area is one of the "temporary memory areas used to enable various values obtained during processing to be used in subsequent processing." In the description below, instead of an expression like "set in an unshown search start node setting area," the description may say "obtain the array element number of the search start node" or "set as the search start node" or simply as "set the search start node." The same applies to items other than the search start node.

Next, at step S402, the array element number acquired at step S401 is stored on the search path stack. Proceeding to step S403, the array element corresponding to that array element number is read out as the node to be referenced. At step S404a a node status is extracted from the node read out, and at step S404b a determination is made whether the node status is in-use. If it is not in-use, in other words, is an empty node, a search result of an empty node is indicated and search processing is terminated. If the node status is in-use, at step S404, the node type is extracted from the read-out node, and at step S405, a judgment is made as to whether the node type is branch node.

If the judgment made at step S405 is that the node type is a branch node, processing proceeds to step S406. At step S406, the discrimination bit position is extracted from the node read out in step S403. Next, in step S407a, a 0 is set in the string position and processing proceeds to step S407b. The string position shows a position in the search key string of a key being processed in the loop from step S407b to S407e which is explained below. The initial value of the string position is 0 in this example.

At step S407b a determination is made whether all of the keys have been processed. If all of the keys have been processed, processing moves to step S408, and if not, processing proceeds to step S407c. In step S407c, the key at the key position pointed to by the string position is extracted from the search key string, and the bit value pointed to by the discrimination bit position extracted in step S406 is extracted. Next in step S407d the bit value extracted in step S407c is set in the bit position pointed to by the string position, in the work area named the node position. Next, at step S407e, the string position is updated and return is made to step S407. The loop processing of the above steps S407b to S407e determines the node position of the node that is the link target.

At step S408, a coupled node indicator of the node read out in step S403, and, proceeding to step S409a, the bit position set in step S407d is added to the coupled node indicator, and as a new array element number, return is made to step S402.

Thereafter the above-described loop processing from step S402 to step S409 is repeated until the judgment at step S405 is leaf node and processing proceeds to step S410a. At step S410a, the reference pointer is extracted from the leaf node and the search terminates. Also, if the index key is stored directly in the leaf node, because the index key is extracted from the leaf node and the search is terminated, in the explanation below, the expression "extract the reference pointer or index key from the leaf node" may sometimes be used.

Next, FIG. 5 to FIG. 8 will be used to described node insert processing in a coupled node tree. FIG. 5 to FIG. 7B describe the usual insert processing, and FIG. 8 describes the processing for insert of a root node. By root node insert processing and usual insert processing, because a coupled node tree is generated, the description of the node insert processing is also a description of the processing to generate a coupled node tree.

Figure 5:
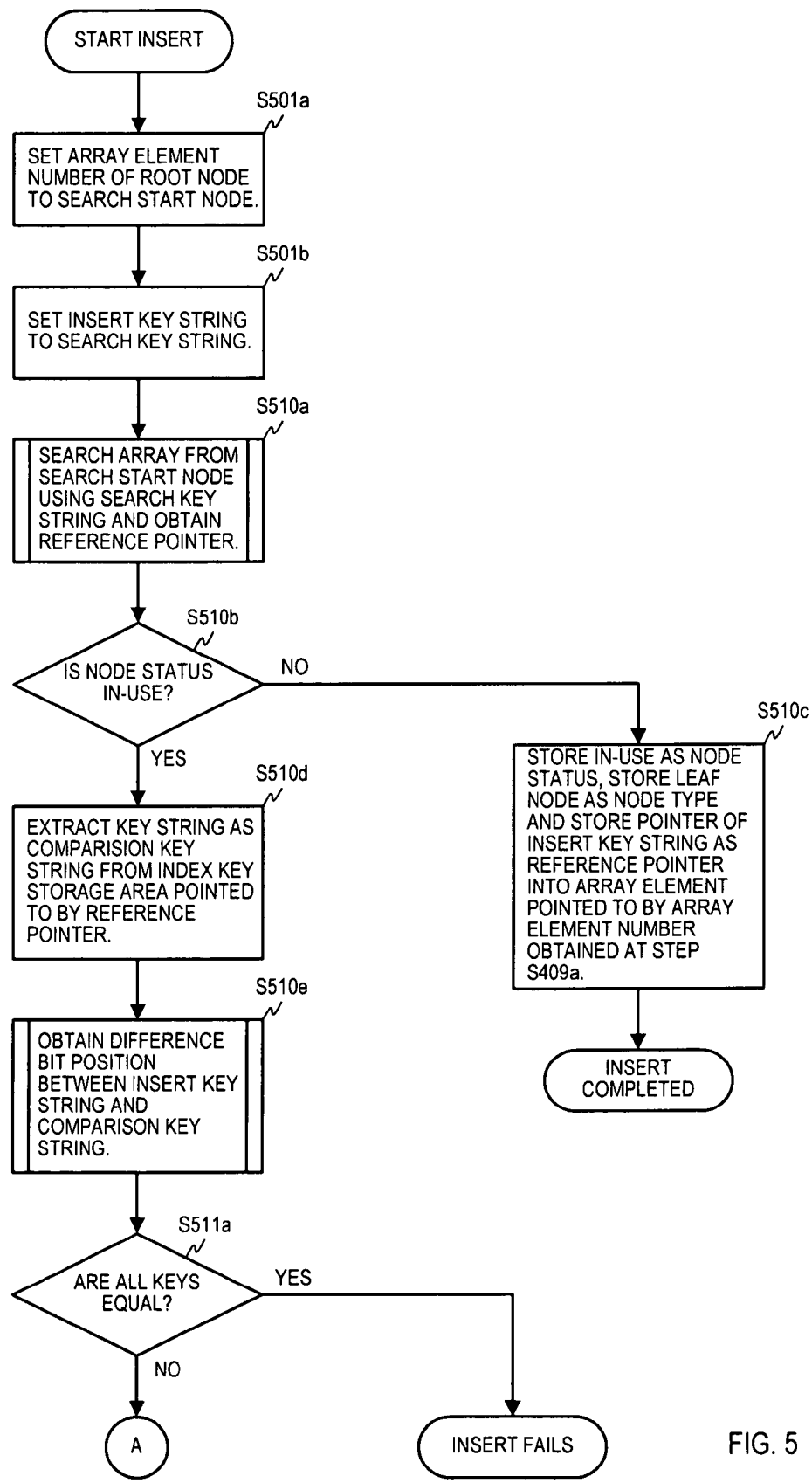
FIG. 5 is a drawing showing the flow of search processing, which is the first part of the insert processing in an embodiment of the present invention.

FIG. 5 is a drawing showing the processing flow for search processing, which is the first stage of insert processing, this corresponding to the using of an insert key as a search key and the root node as the search start node in the search processing shown in FIG. 4.

First, at step S501a, the array element number of the root node is set in the search start node, and at step S501b, the insert key string is set in the search key string. In a preferred embodiment of this invention that stores reference pointers to index keys in leaf nodes, a pointer to a storage area for index keys is acquired beforehand for the insert key string and the insert key string is taken to be stored there in that storage area as a prerequisite for the insert processing. Next, in step S510a, the search processing shown in FIG. 4 is performed with the search key string from the search start node. Next in step S510b a determination is made of the search result of step S510a and if the search result is an empty node, that is, if the node state is not in-use, processing proceeds to step S510c, and the node status of the array element pointed to by the array element number obtained in the search processing of step S409a shown in FIG. 4 and executed in step S510a is set to "in-use", the node type is set to leaf node, the pointer to the insert key is stored in the reference pointer, and insert processing is terminated. If the index key is stored directly in the leaf node, the insert key is written as the index key and insert processing is terminated.

If the determination result of step S510b is that the node status is in-use, in step S510d, the key string pointed to by the reference pointer obtained as the search result in step S510a is extracted and set in the comparison key string. The insert key and the comparison key are compared and whether they completely coincide or not and the difference bit position between the two keys is obtained. The difference bit position between the insert key and the comparison key is taking to be the highest level bit position that first differs in each key when the insert key and the comparison key are compared as bit strings. Details about step S510e are described later referencing FIG. 7A. Next at step S511a, if the result of the comparison in step S510e is that there is equality, the insert key fails because the insert key already exists in the coupled node tree, and processing ends. If, however, there is no equality, processing proceeds to step S512 and thereafter in FIG. 6A.

Figure 6A:
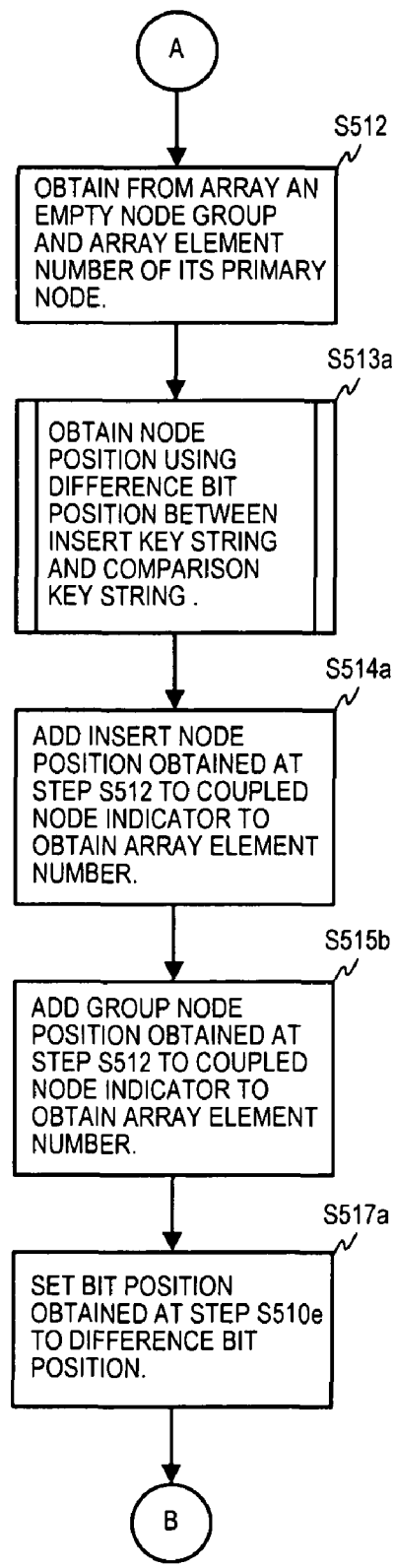
FIG. 6A is a drawing describing the processing flow for preparing array elements for a node group to be inserted in insert processing in an embodiment of the present invention.

FIG. 6A is a processing flowchart describing the processing to prepare an array element number for a node group to be inserted.

In step S512, an empty node group is obtained from the array, and the array element number of the array element to be made the primary node in the node group is acquired. Next in step S513a the insert node position and group node position in the node group are obtained from the difference bit position between the insert key string and the comparison key string obtained in step S510e. Details about step S513a are explained later referencing FIG. 7B.

Proceeding to step S514a, the node position obtained at step S513a is added to the array element number of the primary node obtained at step S512 to obtain an array element number. Next proceeding to step S515b, the group node position in the node group obtained at step S513a is added to the array element number of the primary node obtained at step S512 to obtain an array element number. Although details are described late referencing FIG. 7B, the array element number obtained in step S514a is the array element number of the array element holding the leaf node that includes the reference pointer pointing to the storage area holding the insert key string as an index key. The array element number obtained in step S515b is that of the array element holding the branch node immediately above the leaf node that holds the reference pointer to the key string specified in the comparison key string. That is, by means of the arrangement of the bit value in each key at the difference bit position between the insert key string and the index key associated with the leaf node obtained by the first stage of search processing, a determination is made of the node position in the node group to be inserted wherein the leaf node holding the reference pointer to the insert key string is to be stored and where the branch node immediately above the leaf node obtained in the first stage of search processing is stored.

Figure 6B:
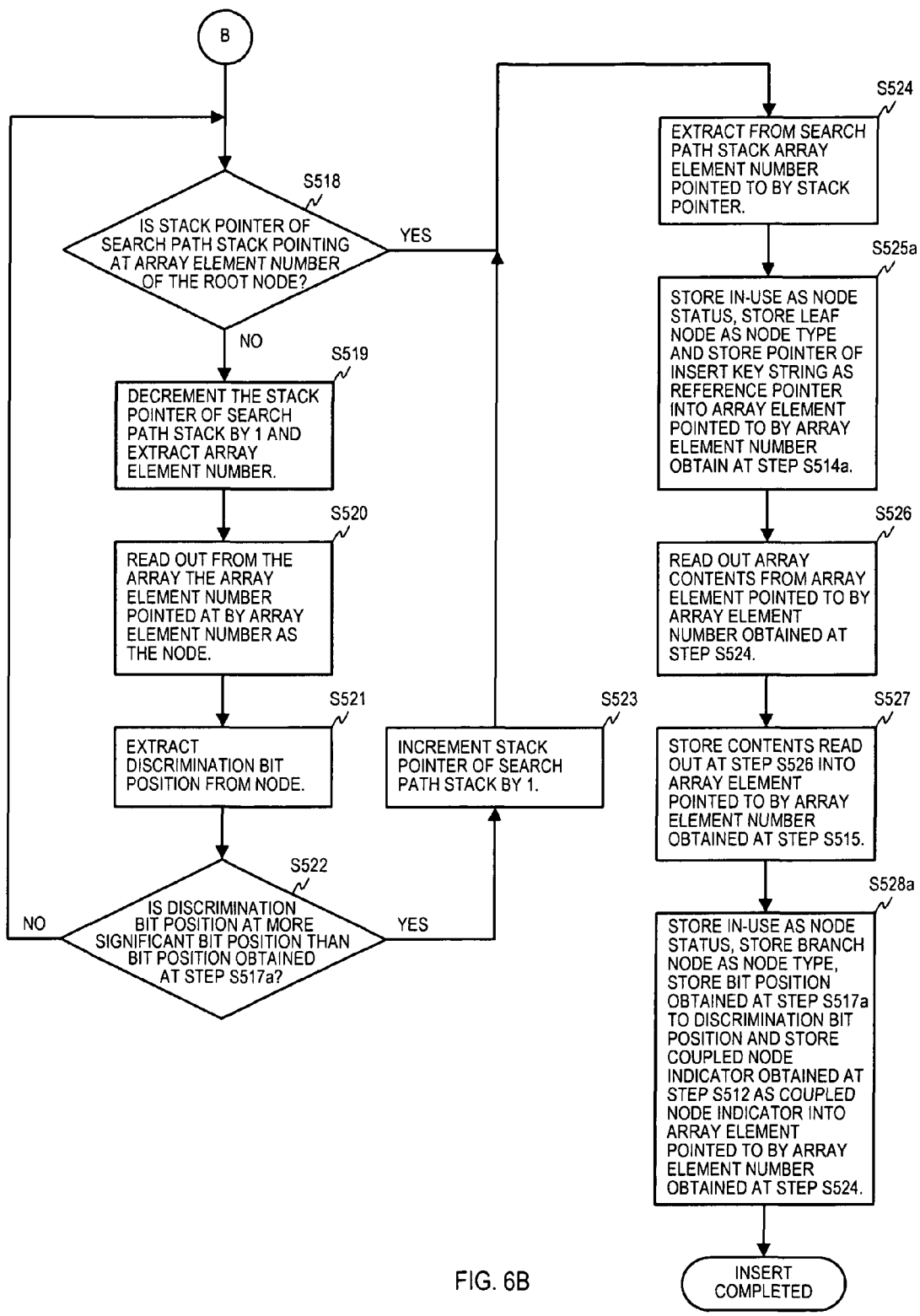
FIG. 6B is a drawing describing the processing flow for determining the position at which a node group is to be inserted, and the storing of the content of each node of the node group to complete the insert processing.

Furthermore, in step S517a, the difference bit position obtained in step S510e is set in the work area named as the difference bit position, and processing proceeds to step S518 shown in FIG. 6B.

FIG. 6B is a drawing showing the processing flow for storing a node in the array element prepared in FIG. 6A, obtaining its insert position and changing the contents of an existing node, thereby completing the insert processing.

The processing from step S518 to S523 is the processing to obtain the position in the coupled node tree for inserting a node group, and the process from step S524 and below is the processing to set data in each node and thereby complete the insert processing.

In step S518, a determination is made as to whether the stack pointer of the search path stack is pointing at the array element of the root node. If it is, processing proceeds to step S524, but if it is not, processing proceeds to step S519.

In step S519, the stack pointer of the search path stack is decremented by 1, and the array element number stacked at that point is extracted.

Proceeding to step S520, the array element with the array element number obtained in step S519 is read out from the array as a node. At step S521, the discrimination bit position is extracted from the node read out in step S520, and processing proceeds to step S522, wherein a judgment is made as to whether the discrimination bit position read out at step S521 is of higher order than the difference bit position set at step S517a. In this case, the term higher order means more to the left in the bit string, that is, having a lower bit position value.

If the determination result in step S522 is negative, return is made to step S518, and the process of steps S518 to S522 is repeated until either the judgment at step S518 is affirmative or the judgment at step S522 is affirmative. When an affirmative judgment results at step S522, processing proceeds to step S523. At step S523, the stack pointer of the search path stack is incremented by 1, and processing proceeds to the processing of step S524 and thereafter.

In the above-described processing at step S518 to step S523, in order to determine the position of insert of a node group, a check is made of the relative positional relationship between the difference bit position (between the index key acquired by the search and the index key to be inserted) and the discrimination bit positions of the branch nodes stored in the search path stack, and the link target of the branch node that is immediately below the first branch node to have a higher level discrimination bit position is made the insert position of the node group to be inserted.

Also in the case wherein the search path stack is back-traced until the root node, the link target of the root node becomes the insert position.

For example, when "101000:001000" is inserted in the coupled node tree of FIG. 2B, the search result index key becomes "101100:001000" corresponding to node 213g. In the case of this example, because the difference bit position between the insert key string and the comparison key string is 3 and the discrimination bit position 230f is 2, the link target of node 213g immediately below node 210f becomes the insert position. In other words, node 213g becomes a branch node, its discrimination bit position becomes the difference bit position 3 between the insert key string and the comparison key string, the leaf node associated with the insert key string is disposed in node position 00 of the node group to be inserted as the link target, and a leaf node into which the contents of node 213g is copied is arranged in node position 10.

Next, the processing of step S524 and thereafter, which is the processing to set data at each node and complete the insert processing, will be described.

At step S524, the array element number that is pointed to by the stack pointer of the search path stack is extracted.

Proceeding to step S525a, information indicating that the node is in-use is stored in the node status of the array element pointed to by the array element number obtained in step S514a, information indicating that the node is a leaf node is stored in the node type, and a pointer to the insert key string is stored in the reference pointer or the insert key string is stored in the index key.

Proceeding to step S526, the array element at the array element number obtained at step S524 is read out from the array.

Next, at step S527, the contents read out at step S526 are stored in the array element having the array element number obtained at step S515.

Finally, at step S528a, information indicating that the node is in-use is stored in the node status of the array element pointed to by the array element number obtained in step S524, information indicating that the node is a branch node is stored in its node type, the difference bit position set in step S517a is stored in its discrimination bit position, the array element number obtained in step S512 is stored in the coupled node indicator, and processing is terminated.

Figure 7A:
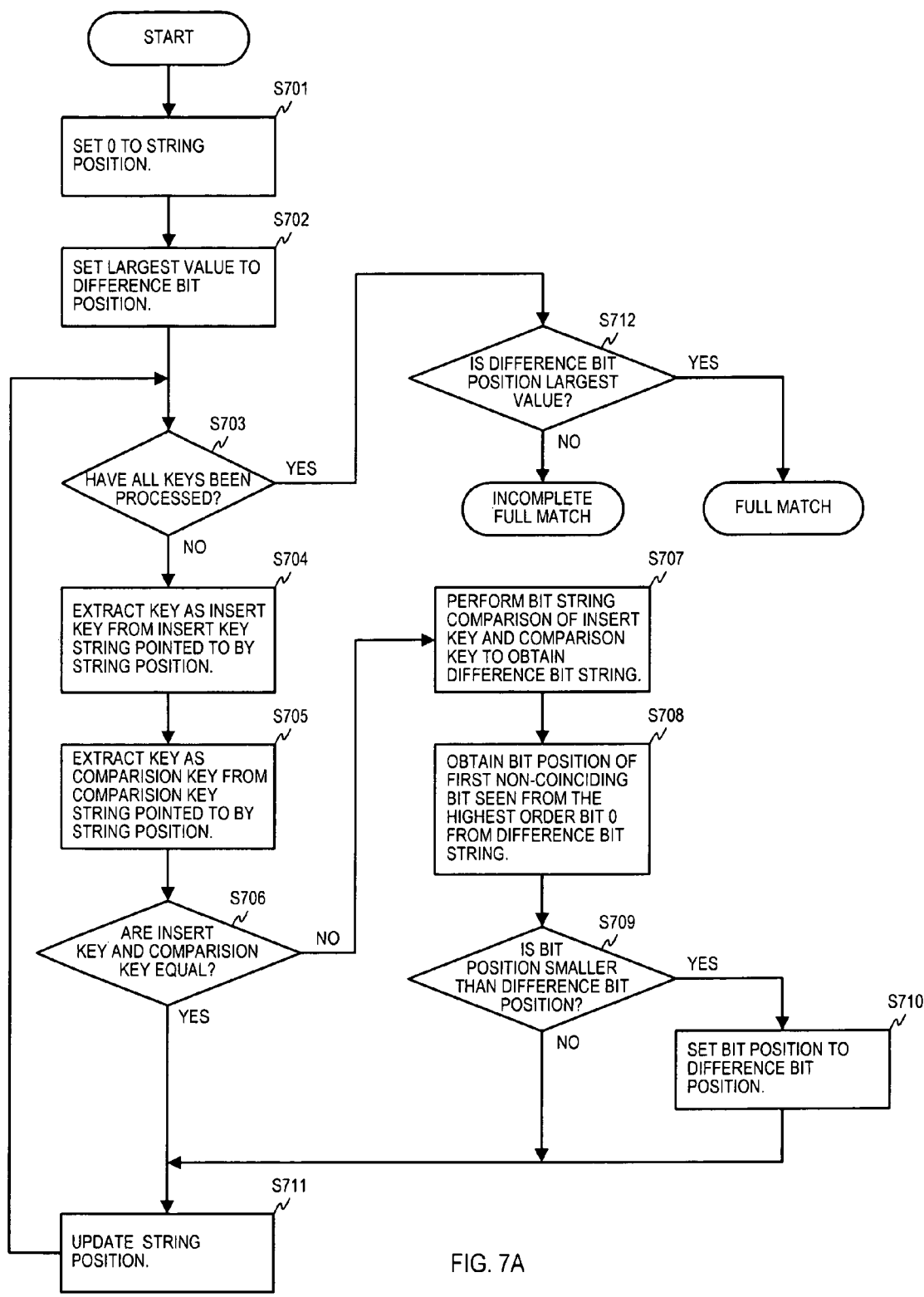
FIG. 7A is a drawing describing the processing flow for obtaining the difference bit position between the insert key string and the comparison key string.

FIG. 7A is a drawing describing details of the processing for obtaining a difference bit position between an insert key string and a comparison key string, shown in step S510e of FIG. 5. The difference bit position between an insert key string and a comparison key string obtained by the processing shown in FIG. 7A is the smallest value of the difference bit positions between each of the keys in the insert key string and the comparison key string, as will become clear in the description below.

As shown in the drawing, in step S701, a 0 is set as the initial value of the string position. Also, in step S702, the largest value of the difference bit positions is set as the initial value of the difference bit positions. If bit position 0 is taken to be the leading bit position in a key composed on n bits, the initial value of the difference bit position becomes n−1.

Next, in step S703, a determination is made whether processing has been finished for all of the keys in the key strings. If all have been processed, processing moves to step S712 and if all have not been processing, processing proceeds to step S704. At step S704 a key pointed to by the string position is extracted from the insert key string and is set as the insert key.

Proceeding to step S705, a key pointed to by the string position is extracted from the comparison key string set in step S510d shown in FIG. 5 and is set as the comparison key.

Next, proceeding to step S706, a determination is made whether the insert key coincides with the comparison key. If they coincide, the value set in the string position is updated and return is made to step S703, and if they do not coincide, processing moves to step S707 and a bit string comparison is done between the insert key and the comparison key, for example, with an exclusive OR, and a difference bit string is obtained.

Proceeding to step S708, the bit position of the first non-coinciding bit, starting from the highest level 0th bit, is obtained from the difference bit string obtained in step S707. This processing could also be done, for example, by inputting that difference bit string into a CPU that has a priority encoder and obtaining the first non-coinciding bit position. Also, processing identical to that of a priority encoder could be implemented in software and the first non-coinciding bit position obtained.

Next, in step S709, a determination is made whether the bit position obtained in step S708 is smaller than the value set in the difference bit position. If it is smaller, at step S710 the bit position obtained in step S708 is set in the difference bit position and processing proceeds to S711, and if it is not smaller, processing proceeds directly to step S711.

The above processing of steps S703 to S711 is repeated for all the keys, and when the processing ends for all the keys, in step S712, a determination is made whether the value set in the difference bit position is the largest value of the difference bit positions. If it is the largest value, a perfect match is indicated and processing is terminated because the determination in step S706 is that it matches all the keys, and if it is not the largest value, a non-perfect match is indicated and processing is terminated. The indication of perfect match/non-perfect match can be done, for example, by setting a 1-bit flag.

Figure 7B:
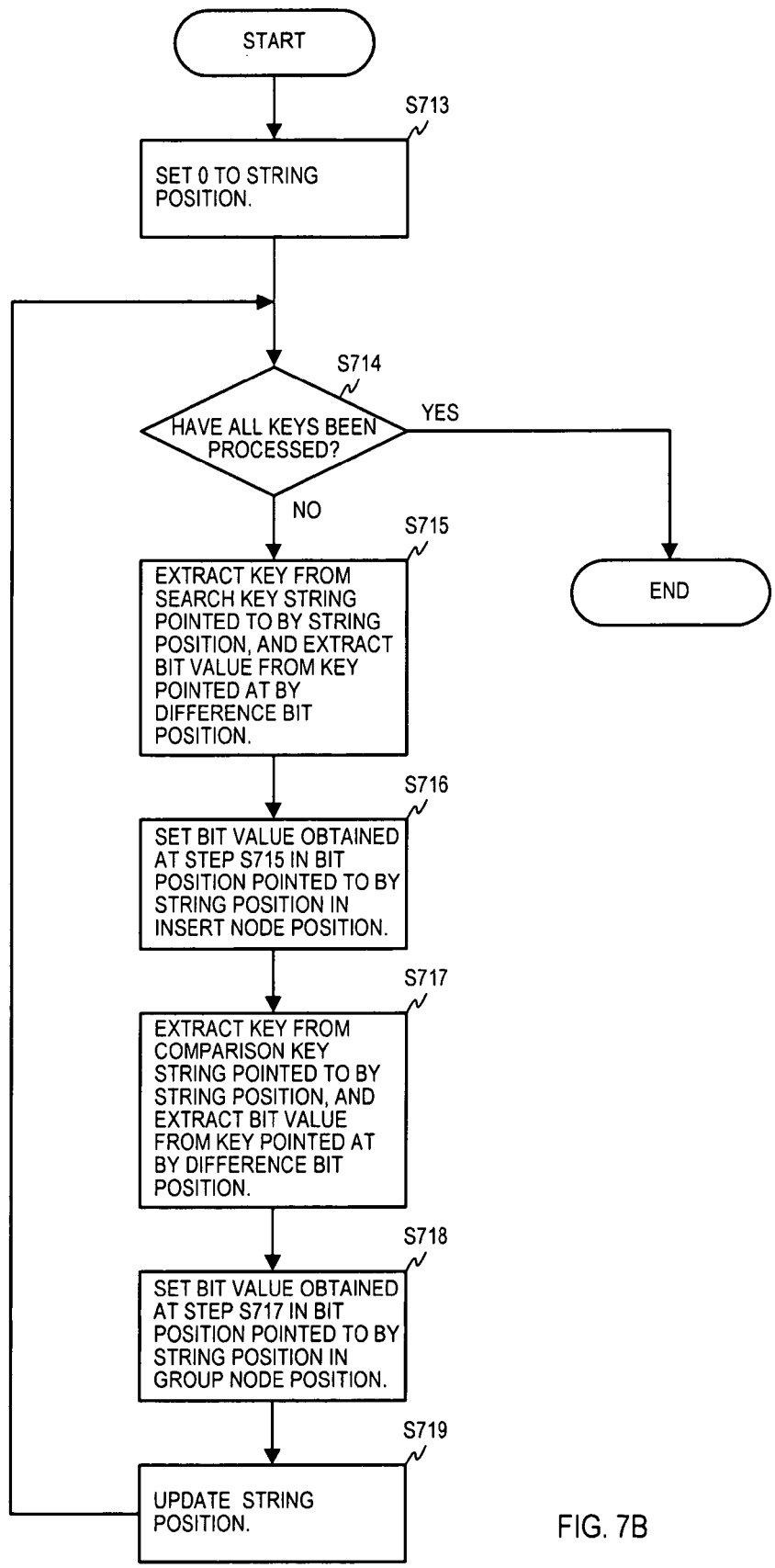
FIG. 7B is a drawing describing the processing flow for determining the node position for the node that is to be stored in the insert node group.

FIG. 7B is a drawing describing the details of the processing for obtaining a node position of the leaf node that should be inserted to the node group which is obtained in step S512 of FIG. 6A and its insert position is obtained by the processing of FIG. 6B, show in step S513a of FIG. 6A, using the bit values in the insert key string and the comparison key string, pointed to by the difference bit position between the insert key string and the comparison key string.

As shown in the drawing, in step S713, the value "0" is set in the string position as an initial value. Next in step S714, a determination is made whether all the keys in the key string have been processed. If they have all been processed, processing terminates. If they have not all been processed, processing proceeds to step S715.

At step S715, the key pointed to by the string position is extracted from the insert key string and the bit value pointed to by the difference bit position is extracted from the key.

Next, at step S716, the bit value extracted in step S715 is set at the bit position in an insert node position pointed to by the string position. Next processing to step S717, the key pointed to by the string position is extracted from the comparison key string and the bit value pointed to by the difference bit position is extracted from the key. Next, at step S718, the bit value extracted in step S717 is set at the bit position in a group node position pointed to by the string position. Next, at step S719, the string position is updated and return is made to step S714.

When the loop processing of steps S714 to S719 has been executed for all the keys configuring the key string, because all of the bit values at the insert node position and the group node position have been set, processing terminates.

Figure 8:
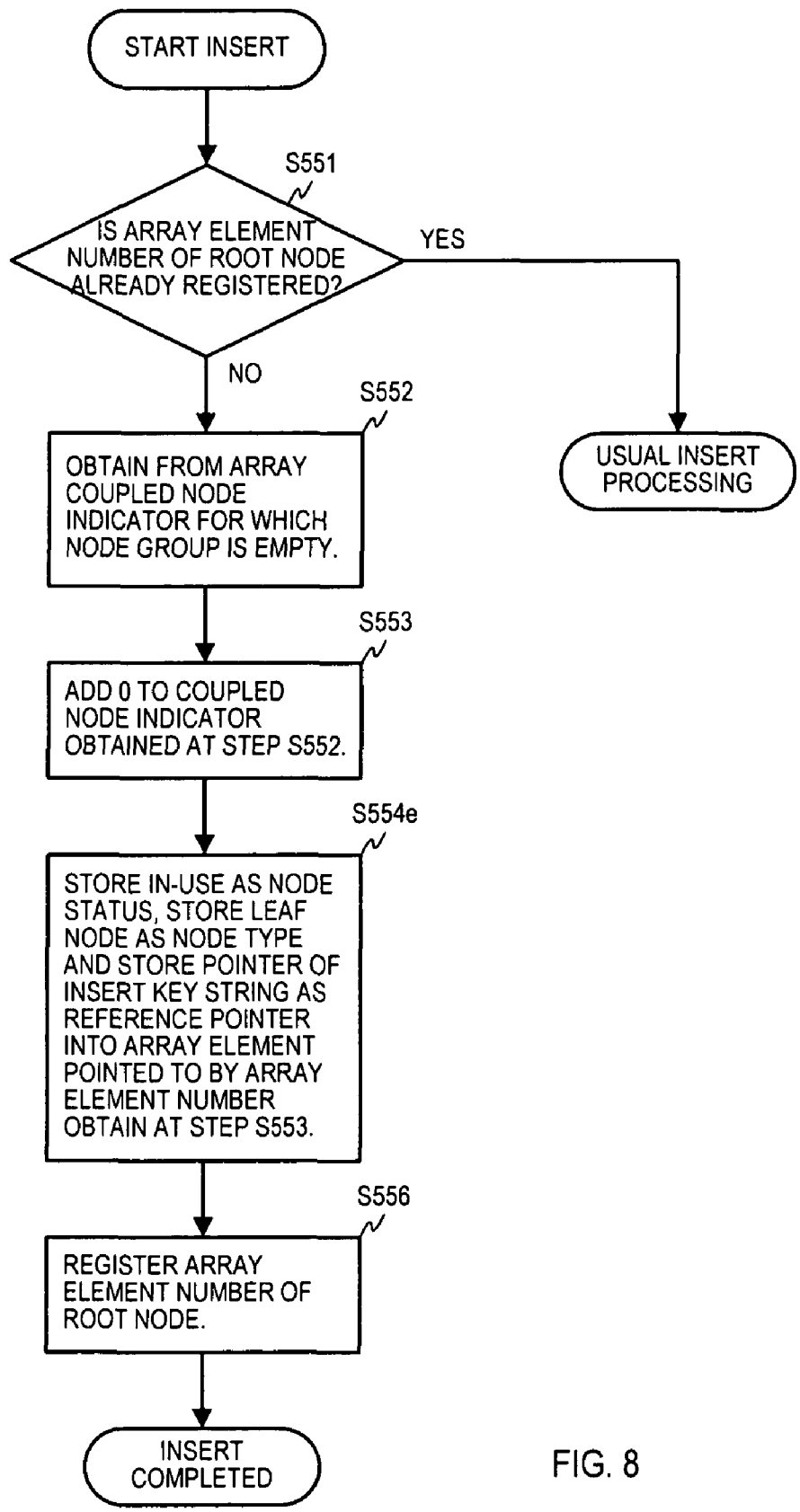
FIG. 8 is a processing flow diagram describing the overall insert processing of a leaf node, including root node insert processing, in an embodiment of the present invention.

FIG. 8 is a processing flow diagram describing the overall node insert processing for inserting an index key, including processing for insert of a root node, in a preferred embodiment of this invention.

In step S551, a judgment is made as to whether the array element number of a root node of a coupled node tree that is to be acquired has already been registered. If it has already been registered, the usual insert processing described using FIG. 5 to FIG. 6B is performed.

At step S551, if the judgment is that the registration has not yet been done, this is the case of the generation and registration of a completely new coupled node tree. Even in this case, in a preferred embodiment that stores a reference pointer to the index key in a leaf node, as a prerequisite of the insert processing, it is assumed that a pointer to a storage area holding an index key is acquired and the storage area is already holding the index key.

First, at step S552, an empty node group is obtained from the array, and the array element number of the array element to be made the primary node is acquired from the node group. Next in step S553, the array element number is determined by adding 0 to the array element number obtained at step S552. (In actuality, this is equal to the array element number acquired in step S552). Next, in step S554e, information indicating that the node is in-use is stored in the node status of the array element having the array element number acquired in step S553, that is to say, the array element corresponding to the root node, information indicating that the node is a leaf node is stored in its node type, and a pointer to the insert key string is stored in the reference pointer or the insert key string is stored in the index key. Then at step S556 the processing is completed by registering the array element number of the root node acquired at step S553.

As described above, it will be understood that when there is a set of index keys, the index keys are successively extracted therefrom, and the processing of FIG. 8 and FIG. 5 to FIG. 6B is repeated so as to enable the creation of a coupled node tree according to the present invention corresponding to the set of index keys.

Figure 9A:
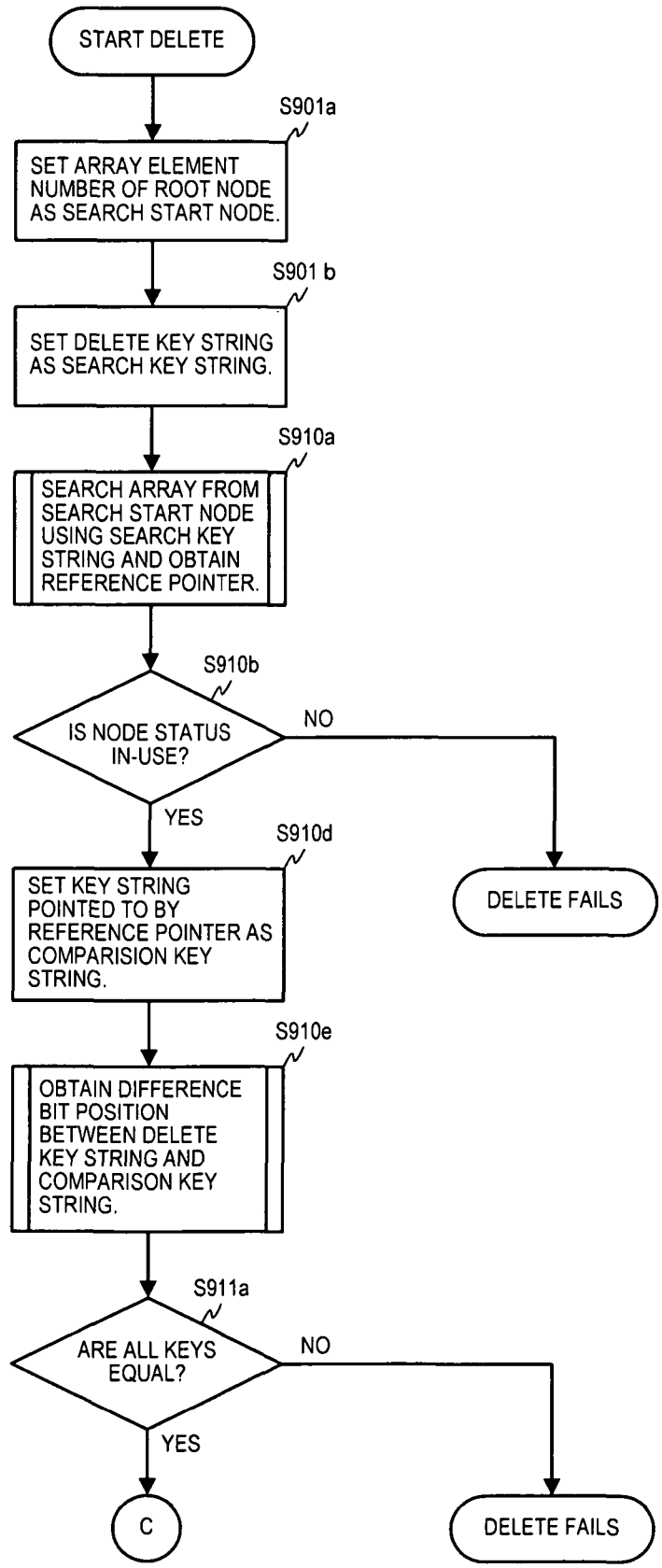
FIG. 9A is a drawing showing the processing flow for search processing, which is the first part of delete processing in an embodiment of the present invention.
Figure 9B:
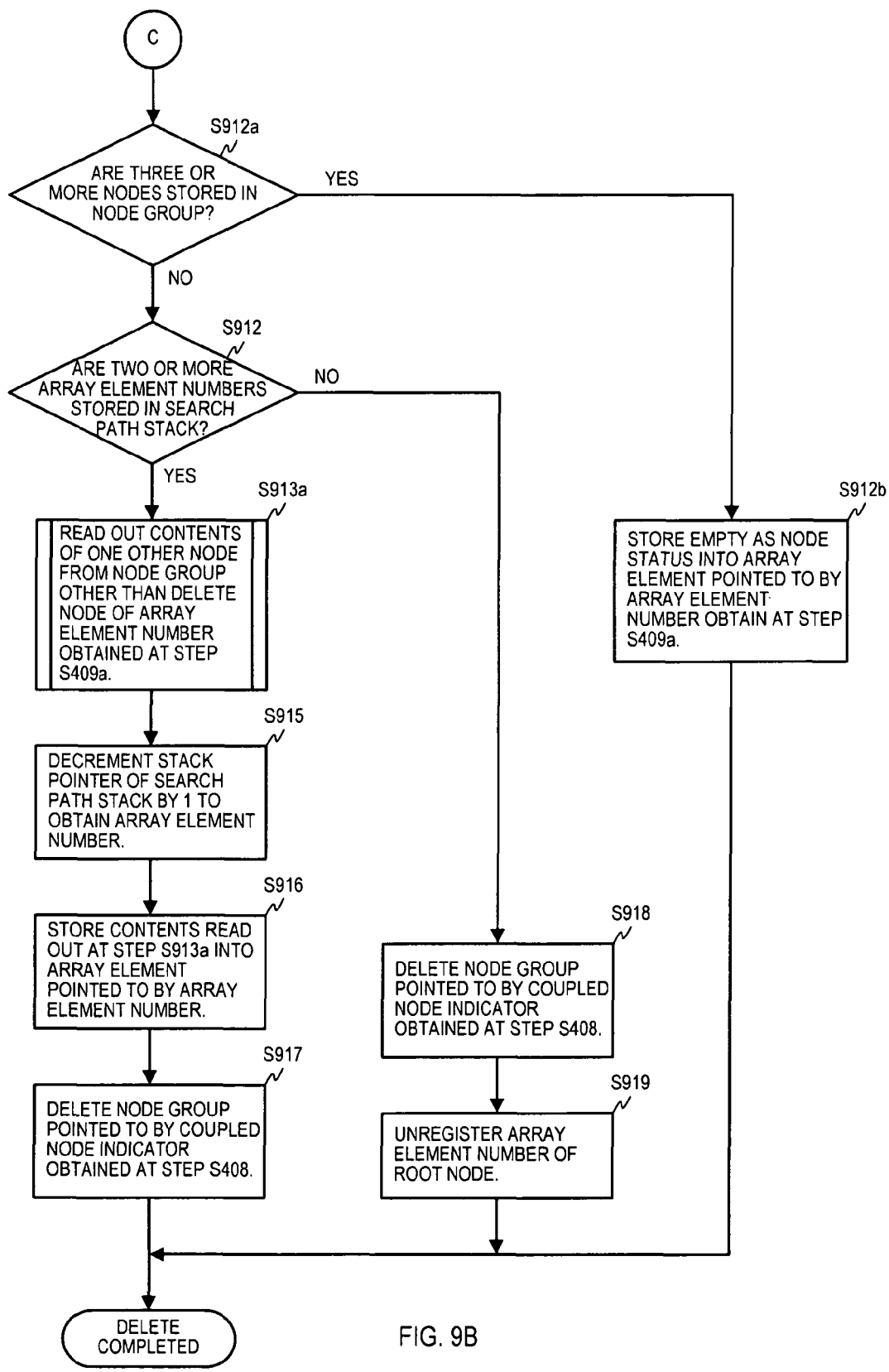
FIG. 9B is a drawing describing the processing flow of the latter part of delete processing in an embodiment of the present invention.

Next, referencing FIG. 9A and FIG. 9B, the processing flow to delete from a coupled node tree a leaf node corresponding to a specific index key, according to a preferred embodiment of this invention, is described.

FIG. 9A is a drawing showing the processing flow for search processing, which is the first stage of delete processing, this corresponding to the using of a delete key as the search key in the search processing shown in FIG. 4 with the root node as the search start node.

First, at step S901a, the array element number of the root node is set in the search start node, and, at step S901b, the delete key string is set in the search key string.

Next in step S910a, the search processing shown in FIG. 4 is performed using the search key string and the search start node. If a leaf node is reached, a reference pointer or index key is acquired. In step S910b, a determination is made whether the node status of the node that is the search result of step S910a is "in-use", and if it is not "in-use", "delete fails" is returned, and if it is "in-use", processing proceeds to step S910d and the key string pointed to by the reference pointer or the index key is extracted and set in the comparison key string.

Next, in step S910e, a difference bit position is obtained from the delete key string and the comparison key string by the processing shown in FIG. 7A. In step S911a, a determination is made whether a complete match is indicated as the result of the processing in FIG. 7A executed in step S910e, that is to say, that all the keys in the delete key string and the comparison key string are identical, and because if there is no equality the index key to be deleted does not exist in the coupled node tree, the delete fails, and processing ends. But if there is equality, processing proceeds to step S912a and thereafter in FIG. 9B.

FIG. 9B is a drawing describing the processing flow of the latter stage of the delete processing.

First, at step S912a, a determination is made as to whether 3 or more nodes are stored in the node group to which the search result node belongs, in other words, whether 3 or more nodes have the node status of "in-use". This determination can be made by storing the node position obtained in the search processing temporarily—as was mentioned as "depending on the processing, a temporary memory area can be used to enable various values obtained during processing to be used in subsequent processing" with reference to the hardware configuration shown in FIG. 3 above—and then by accessing the node statuses for each of the node positions in the node group in combination with the array element numbers stacked in the search path stack.

If the determination at step S912a is that 3 or more nodes are stored in the node group, because 2 or more nodes will remain after the node that is object of delete is deleted, processing moves to step S912b and "empty" is stored in the node status of the node stored in the array element for the array element number obtained in step S409a of the search processing shown in FIG. 4, that is to say, for the array element number stored in the search path stack, and processing is terminated.

If the determination at step S912a is that 3 or more nodes are not stored in the node group processing moves to step S912. As was mentioned above, because no node group consists of only 1 in-use node other than the node group to which the root node belongs, in this case there are 2 in-use nodes and because the nodes status of one of those nodes will be made "empty", the other 1 node is moved to another node group, and the original node group is deleted.

At step S912, a determination is made as to whether there are at least 2 array element numbers on the search path stack. Stated differently, when there is only 1, it is the array element number of the array element in which the root node is stored. In this case, processing moves to step S918, wherein the node group relating to the array element number of the root node obtained at step S901a is deleted, and at step S919 the registration of the array number of the root node is purged, and processing is terminated.

When at step S912 the judgment is made that there are two or more array element numbers stored in the search path stack, processing proceeds to step S913a, wherein the contents of the one other in-use node other than the node that is the object of delete are read out. Details of the processing of step S913a are explained below, referencing FIG. 10.

Next in step S915 the stack pointer of the search path stack is decremented by 1 and the array element number is extracted, and in step S916 the contents read out at step S913a are stored in the array element pointed to by that array element number. This processing corresponds to moving the above mentioned other in-use node to another node group.

Continuing, in step S917, the node group related to the coupled node indicator obtained in step S408 of the search processing shown in FIG. 4 executed in step S910a is deleted and processing is terminated.

Figure 10:
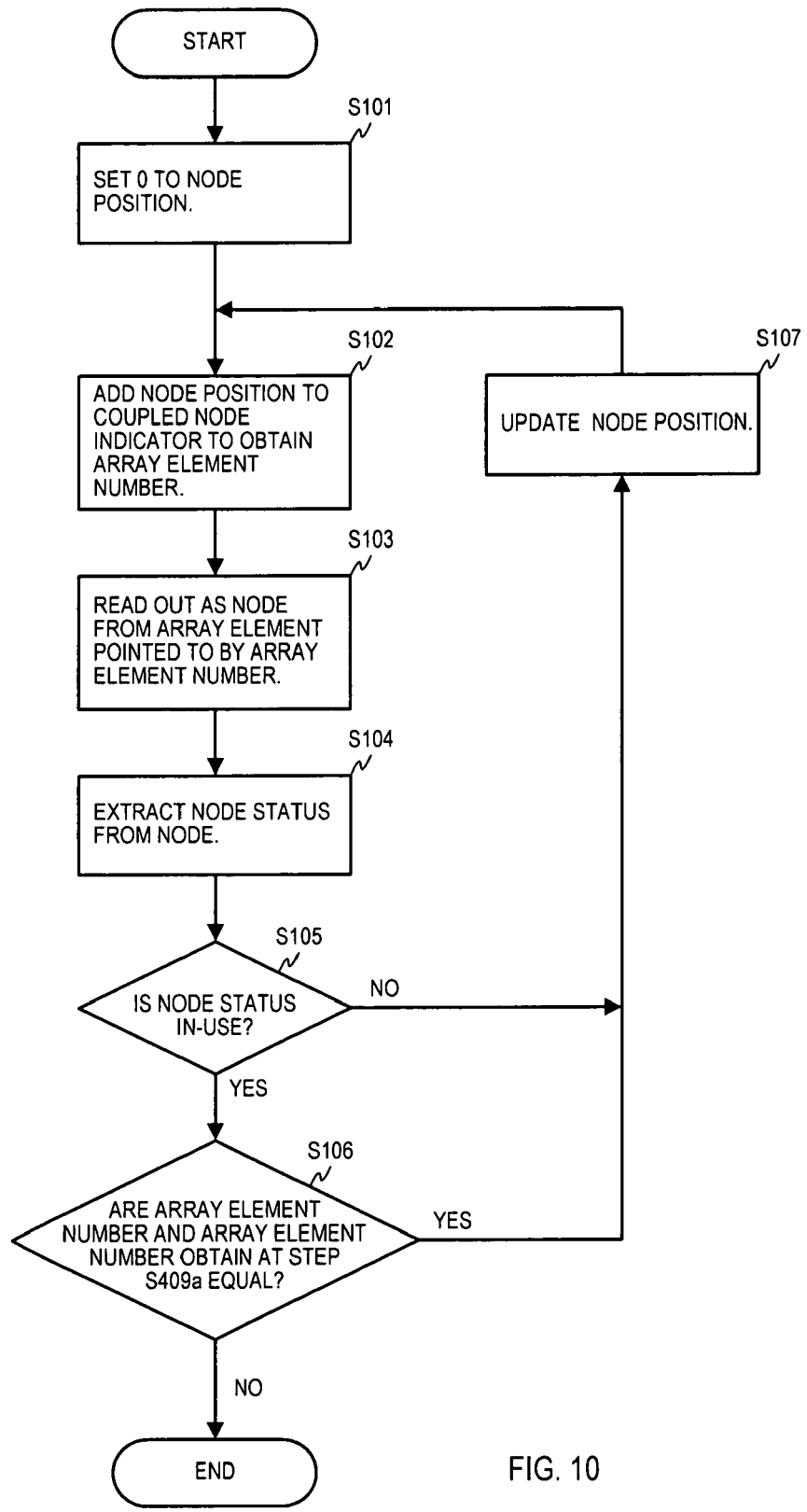
FIG. 10 is a drawing describing the processing flow for determining the nodes to be processed in a node group other than the node that is the object of the delete.

FIG. 10 is a drawing describing details of the processing for reading out from the node group the contents of the one other in-use node other than the node that is the object of delete, shown in step S913a of FIG. 9B.

As shown in the drawing, at step S101, the initial value 0 is set in the node position. Next, proceeding to step S102, the value set in the node position is added to the coupled node indicator obtained in step S408 of the search processing shown in FIG. 4 which is executed in step S910a and an array element number is obtained. At step S103, the array element pointed to by the array element number obtained in step S102 is read out as a node and at step S104 the node status is extracted from that read-out node.

Next in step S105, a determination is made whether that extracted node status indicates the node is in-use, and if the node is not in-use processing proceeds to step S107 and if the node is in-use processing proceeds to step S106.

At step S106, a determination is made whether the array element number obtained in step S102 is identical to the array element number of the node that is to be deleted, that is to say, the array element number obtained in step S409a of the search processing shown in FIG. 4 and which is executed in step S910a, and if they are identical, processing proceeds to step S107 and if they are not identical, because the contents of the one other in-use node other than the node that is the object of delete has been read out in step S103, processing is terminated.

In step S107, the node position is updated and a return is made to step S102.

Although another in-use node is searched for in ascending sequence of the node positions using an initial value of 0 as the smallest value for a node position, the search sequence is not limited to that sequence and a search, for example, in descending sequence is also possible. Also, although in step S106 in the drawing a determination is made whether the array element number obtained in step S102 is identical to the array element number of the node that is to be deleted it is clear that this determination can be done immediately after step S102.

Next the delete processing and insert processing related to a preferred embodiment of this invention are described by means of a concrete example.

Figure 11A:
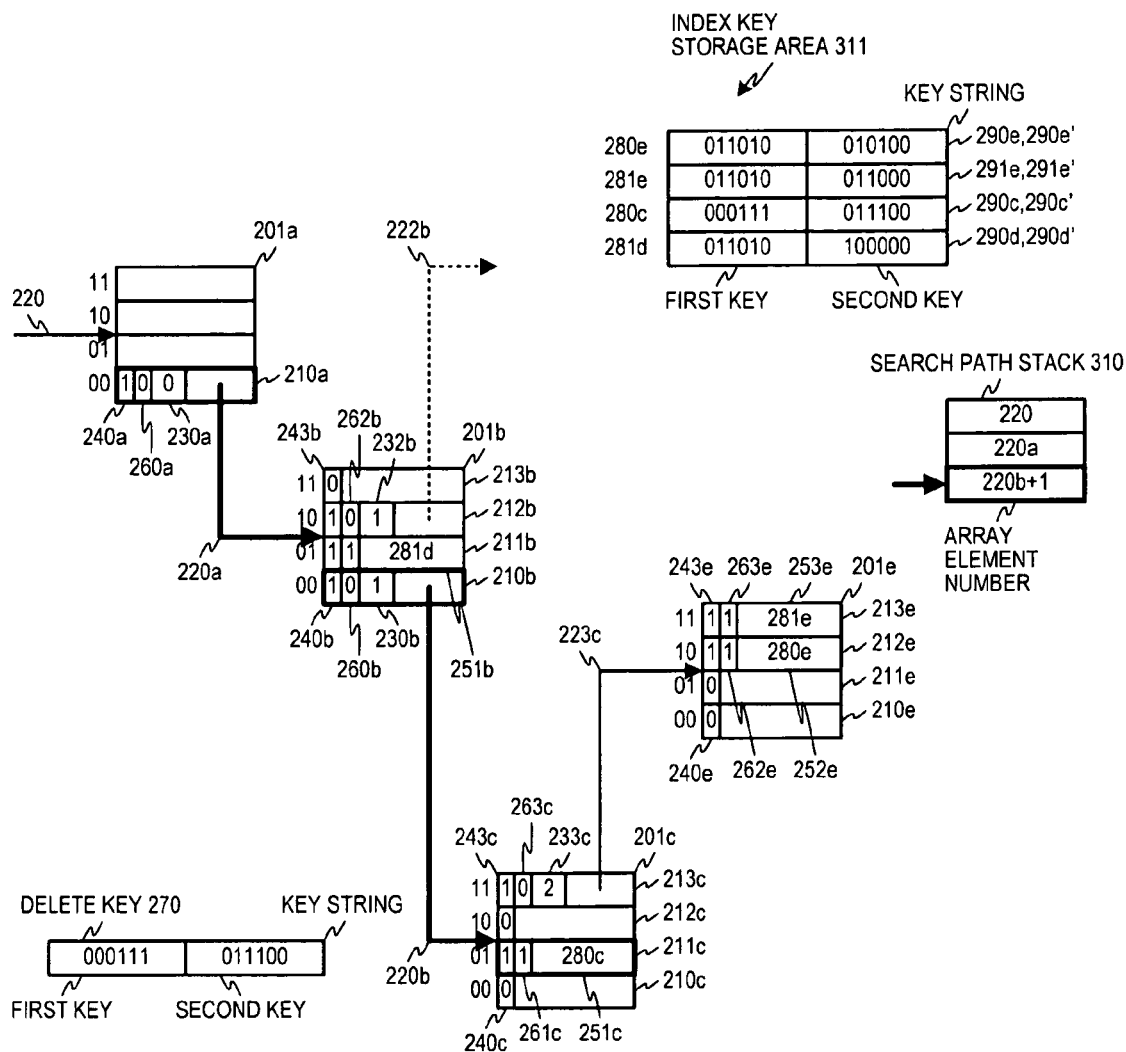
FIG. 11A is a drawing describing a double coupled node tree and an example of a delete key before delete processing in the first example of delete processing.
Figure 11B:
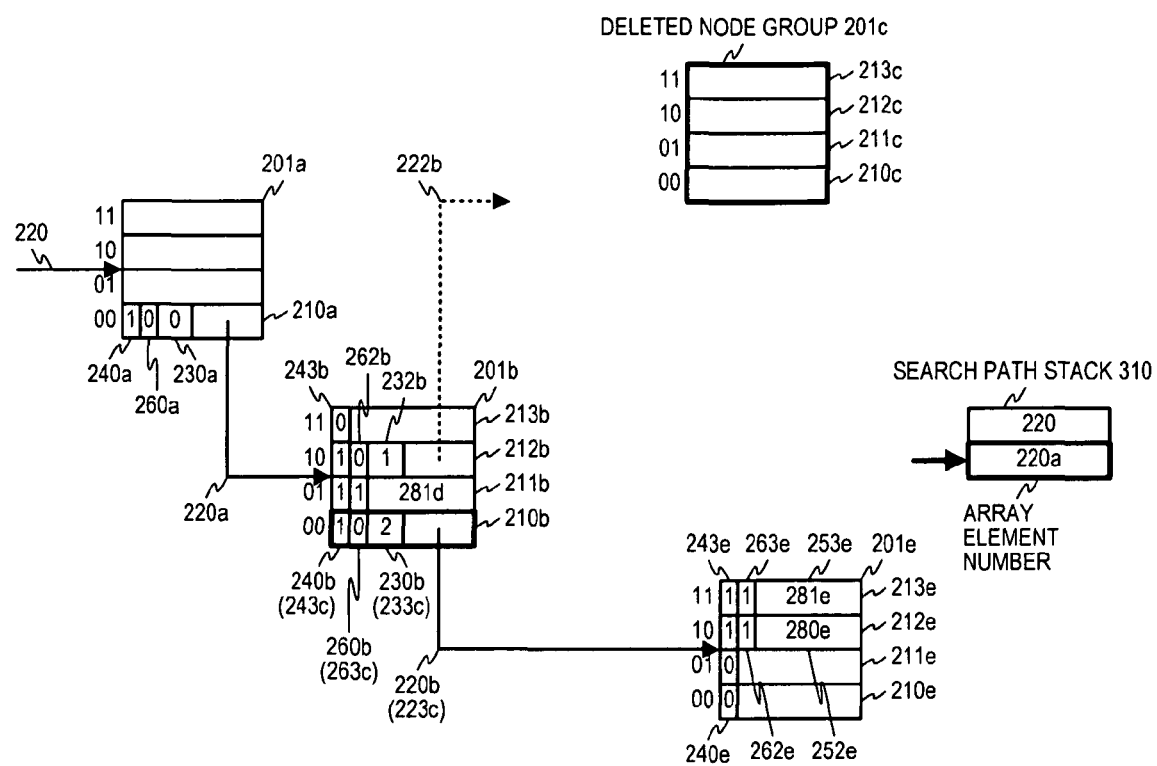
FIG. 11B is a drawing describing an example of a double coupled node tree after delete processing in the first example of delete processing.

FIG. 11A and FIG. 11B are drawings describing the delete of the index key string "000111:011100" from the double coupled node tree shown as the example in FIG. 2B. In the double coupled node tree shown in FIG. 11A, the nodes of node group 201f and below are omitted. Also the index keys related to the leaf nodes of node group 201f and below are omitted from the index key storage area 311. The delete key string "000111:011100" is composed of the first key "000111" and the second key "011100" and is stored in the delete key 270, which is a temporary storage area. Array element numbers are stored in the search path stack 310 and this stack pointer points to the array element number 221b+1.

Nodes enclosed by thick lines in the drawing are the nodes that are traversed by the search processing, the array element numbers thereof, from that of the root node 210a to that of the leaf node 211c, being stored in the search path stack 310.

In the search processing using a delete key string "000111: 011100", first the array element number 220 of the root node 210a is acquired and stored in the search path stack 310. Because the discrimination bit position 230a of the root node 210a is 0, and the bit values at bit position 0 of both the first key and the second key are 0, the coupled node indicator 220a with 00 added is stored in the search path stack 310.

Next, the node 210b pointed to by the array element number 220a is read out and a determination is made that it is a branch node. Because the discrimination bit position 230b is 1, and the bit value at bit position 1 in the first key is 0 while the bit value at bit position 1 in the first key is 1, 01 is added to the coupled node indicator 220b, obtaining the array element number 220b+1, and that value is stored in the search path stack 310.

Next node 211c is read out and its node type 261c is 1, indicating a leaf node. The index key (key strings 290c and 290c') corresponding to this leaf node is stored in the storage area shown by the reference pointer 280c. That storage area is one part of the index key storage area 311. There, the value of the index key referenced by the reference pointer 280c is "000111:011100" and that coincides with the key string stored in the delete key 270

In the status shown in FIG. 11A, the contents of the one other in-use node 213c other than the node 211c that is the object of delete are read out and these contents are stored in the array element (node 210b) having the array element number 220a that is stored in the location pointed to by the stack pointer of the search path stack 310 after decrementing the pointer by 1. After that, the node group 201c is deleted. All of the nodes belonging to the node group where the node is deleted are now empty and the node group can be reused.

The double coupled node tree shown in FIG. 11B shows the status after completion of the delete processing. As shown by the reference symbols in parentheses, the values stored in node 213c are stored without change in the node type 260b, the discrimination bit position 230b and the coupled node indicator 220b of node 210b. Also the stack pointer of the search path stack 310 points to the array element number 220a.

Next, a detailed example of the delete processing is described for the case wherein 3 or more "in-use" nodes are in the node group belonging to the node that is the object of the delete.

Figure 11C:
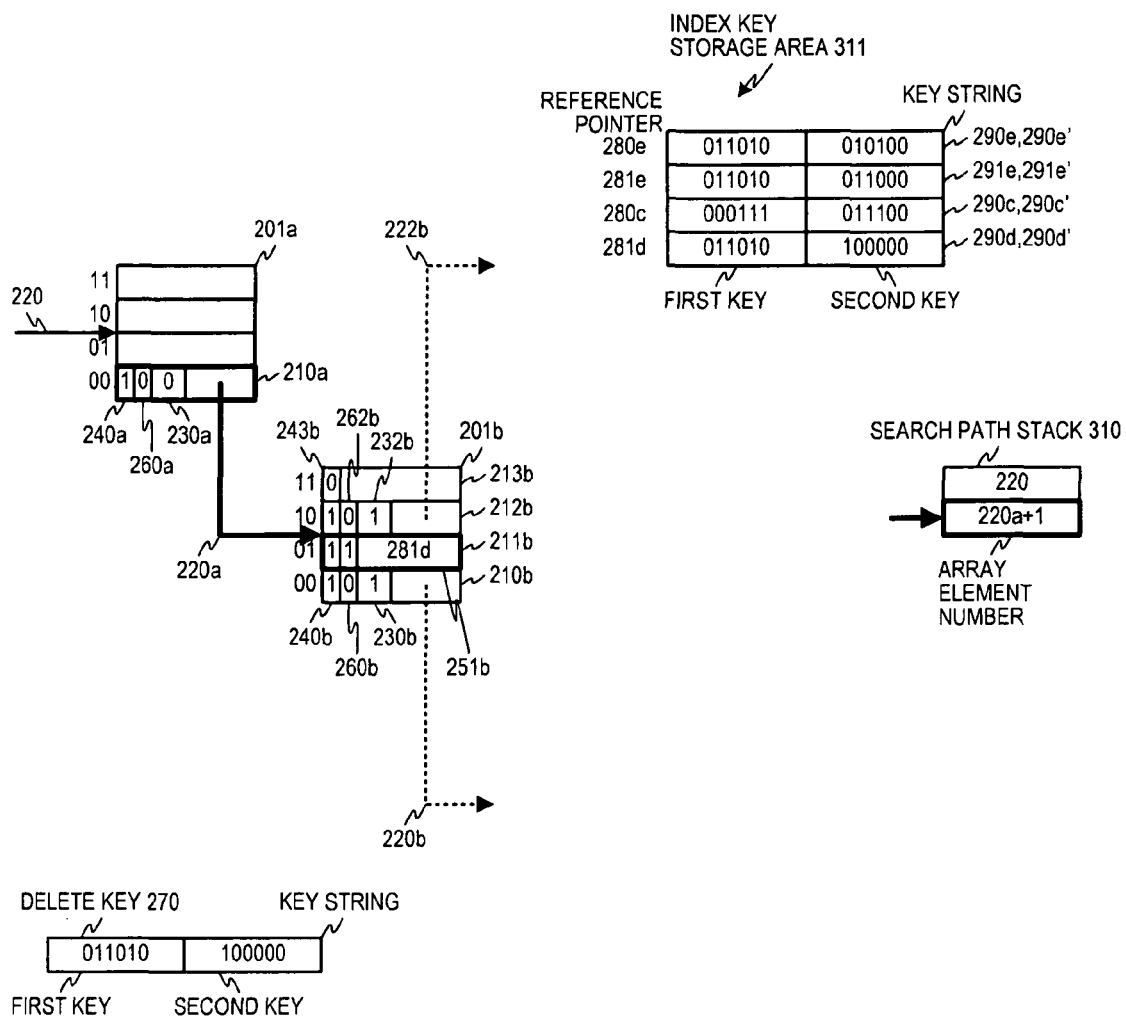
FIG. 11C is a drawing describing a double coupled node tree and an example of a delete key before delete processing in the second example of delete processing.
Figure 11D:
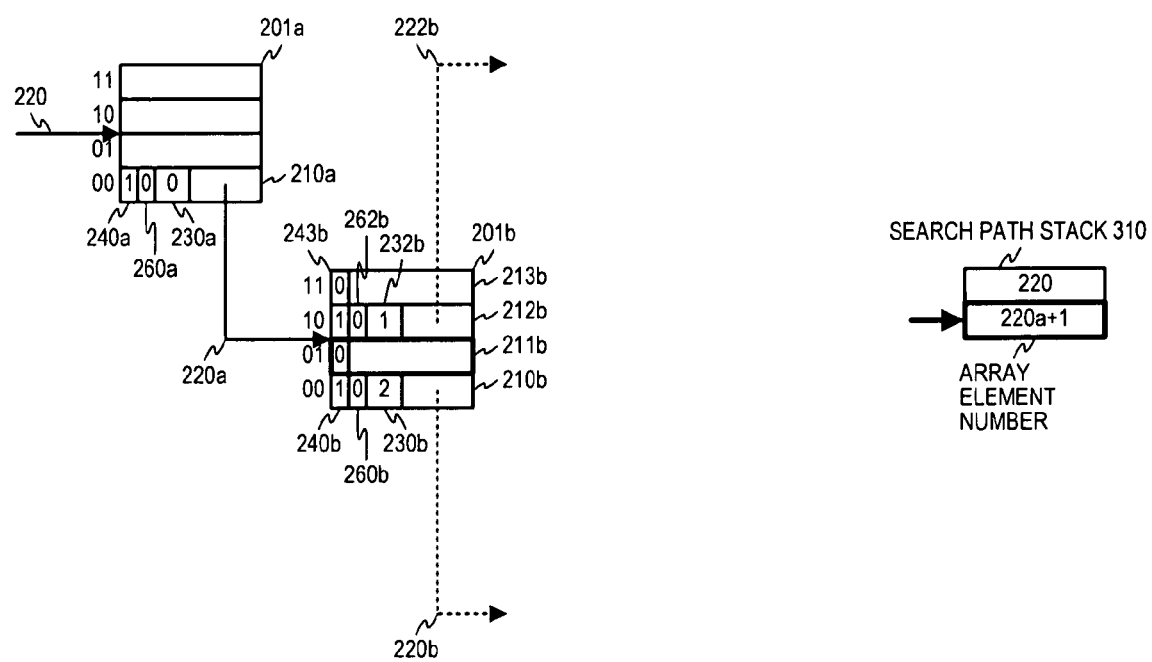
FIG. 11D is a drawing describing an example of a double coupled node tree after delete processing in the second example of delete processing.

FIG. 11C and FIG. 11D are drawings describing an example of delete processing for the double coupled node tree shown in the example of FIG. 2B with "011010:100000" as the delete key. In the double coupled node tree shown FIG. 11C, notations for the node group 201f and below and the node group 201c and below are omitted. Also, notations related to the leaf nodes of node group 201f and below are omitted from the index key storage area 311. Deletion key string "011010:100000" is a key formed from the first key "011010" and the second key "100000" and is stored in the delete key 270 in the temporary storage area.

Array element numbers are stored in the search path stack 310, and the stack pointer points to the array element number 220a+1. Nodes enclosed in thick lines in the drawing are nodes traversed during the search, and their array element numbers, from that of the root node 210a to the leaf node 211b are accumulated in the search path stack 310.

In the search processing using the delete key string "011010:100000", first, the array element number of the root node 210a is acquired and is stored in the search path stack 310. Because the discrimination bit position 230a of the root node 210a is 0 and the bit values at bit position 0 of the first key and the second key are 0 and 1 respectively, the array element number 220a+1, derived by adding the bit value 1 to the coupled node indicator 220a, is stored in the search path stack 310. The node 211b pointed to by array element number 220a+1 is read out and its node type 261b is 1, indicating a leaf node. The index key corresponding to the leaf node 211b (key strings 290d and 290d') is stored in the storage area indicated by reference pointer 281d. The value of the index key referenced by the reference pointer 281d is "011010: 100000" and it coincides with the key string stored in the delete key 270.

Because there are 3 "in-use" nodes, 210b, 211b, and 212b, in the node group 201b including the node 211b that is the object of the delete, a 0 is stored in the node status of node 211b, making it "empty", and the double coupled node tree after delete processing shown in FIG. 11D is obtained.

Figure 12A:
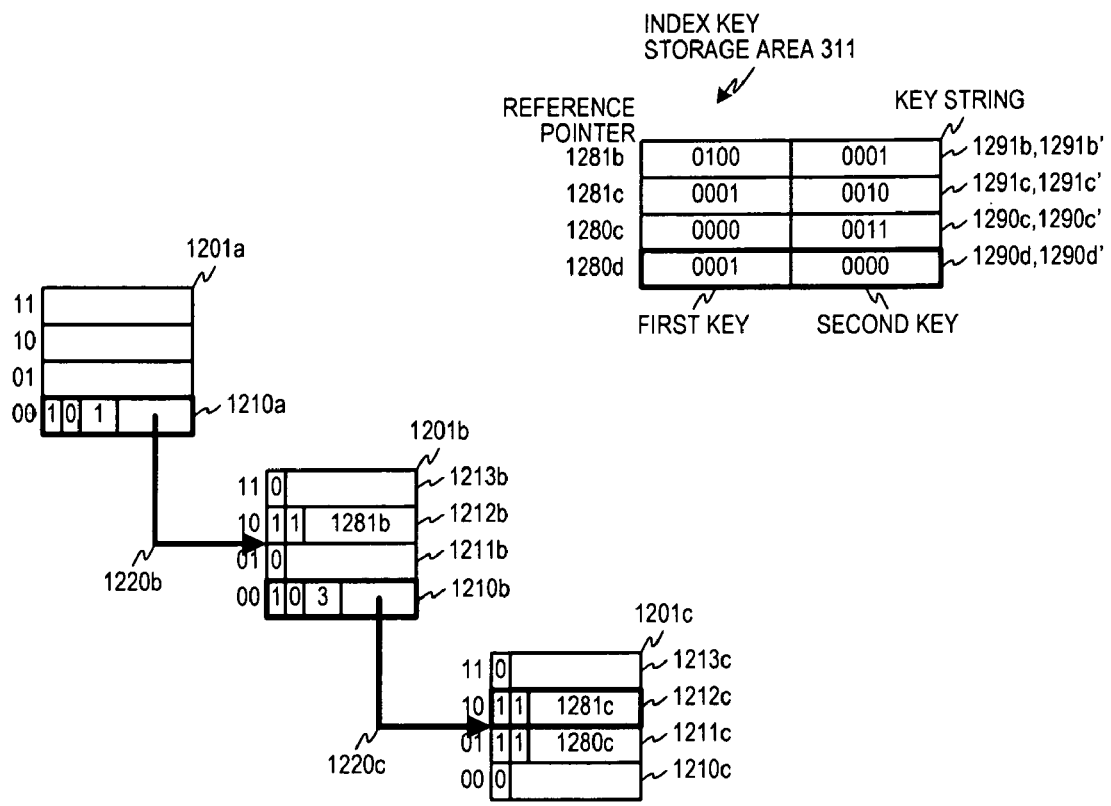
FIG. 12A is a drawing showing an example of a coupled node tree before insert processing in a first concrete example.
Figure 12B:
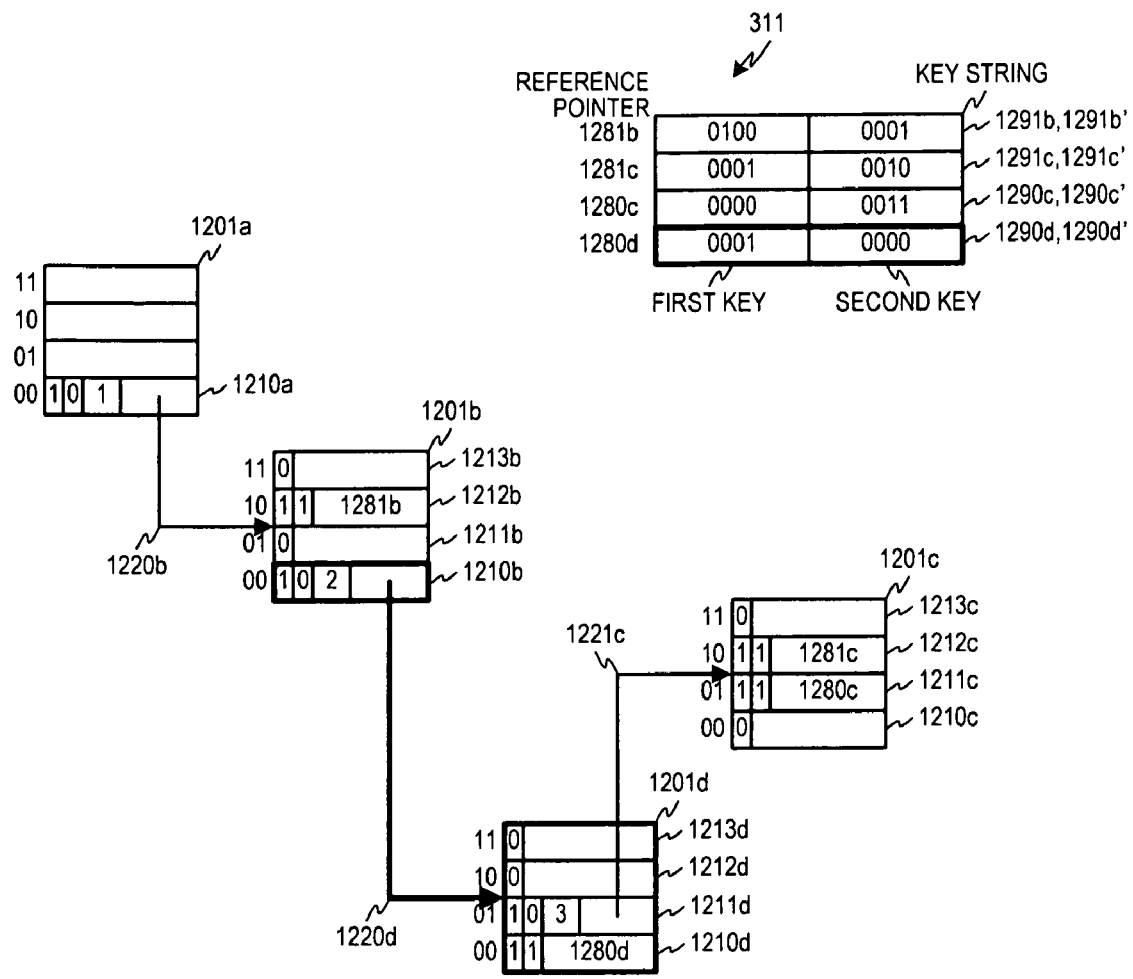
FIG. 12B is a drawing showing an example of a coupled node tree after insert processing in the first concrete example.

Next, referencing FIG. 12A and FIG. 12B, insert processing is described using concrete example 1. This concrete example 1 is an example of the case wherein an index key has been obtained as a search result using an insert key, in other words, the case wherein the determination in step S510b shown in FIG. 5 is that the node status indicates that the node is in-use.

What is shown in FIG. 12A is the coupled node tree that has the bit strings "0100:0001", "0001:0010", and "0000:0011" referenced by the reference pointers 1281b, 1281c, and 1280c. The key string composed of the first key 1291b "0100" and the second key 1291b' "0001" is stored in the storage area in index key storage area 311 pointed to by the reference pointer 1281b. In the same way, the key string composed of the first key 1291c "0001" and the second key 1291c' "0010" is stored in the storage area pointed to by the reference pointer 1281c and the key string composed of the first key 1290c "0000" and the second key 1290c' "0011" is stored in the storage area pointed to by the reference pointer 1280c.

The insert key string to be inserted hereinbelow is the "0001:0000" shown in the example. As described above, it is presumed that the pointer 1280d to the index key storage area 311 is acquired and that the insert key is stored in the storage area pointed to by the pointer 1280d as the first key 1290c and the second key 1290c'.

The tree shown consists of the node groups 1201a, 1201b, and 1201c.

The primary node of the node group 1201a is the root node 1210a, and 1 is held in the discrimination bit position thereof. The primary node 1210b of the node group 1201b below the node group 1201a is a branch node, with a 3 stored in the discrimination bit position thereof, and the in-use node 1212b belonging to the same node group as the primary node 1210b is a leaf node, in which is held the reference pointer 1281b pointing to the key strings 1291b and 1291b'. The node 1210b, which is a branch node, is linked to the node group 1201c.

Both the in-use nodes 1210c and 1211c that belong to the node group 1201c are leaf nodes, which hold the reference pointers 1280c and 1281c, respectively, which in turn, point to the key strings 1290c, 1290c' and 1291c, 1291c'. The node positions of nodes 1211c and 1212c are 01 and 10 respectively.

Because the arrangement of the bit value at bit 1 of the first key 1290d and the second key 1290d' of the insert key string is 00 and the arrangement of the bits values at bit 3 is 10, in the case of the example shown, when a search is done with the insert key string from the root node 1210a, leaf node 1210c holding the reference pointer 1280*c* is reached via node 1210*b*, and 1291*c*, 1291*c* "0001:0010" are set as the comparison key string.

FIG. 12B is a drawing describing the coupled node tree after insert processing. The node group 1201*d*, which includes the leaf node 1210*d* holding the reference pointer 1280*d* for the insert key strings 1290*d* and 1290*d'* and the branch node 1211*d* into which has been copied the contents of the branch node 1210*b* immediately above the leaf node 1212*c* that holds the reference pointer for the comparison key string, has been inserted into the coupled node tree shown in FIG. 12A, and this node group is made the link target of branch node 1210*b*.

Because the difference bit position of the insert key string and the comparison key string is 2 in the case illustrated and the discrimination bit position of the branch node 1210*b* is 3 and is larger than the difference bit position and the discrimination bit position of the branch node 1210*a* immediately above is 1 and is smaller than the difference bit position, the insert position of node group 1201*d* becomes the position immediately below the node 1210*b* pointed to by the array element number 1220*b*.

The node position (insert node position) that holds leaf node 1210*d* which has the reference pointer for the insert key string is 00 due to the arrangement of the bit values at the difference bit position in the insert key string, and the node position of the node (group node position) into which has been copied the contents of the branch node 1210*b* immediately above the leaf node 1212*c* holding the reference pointer to the comparison key string is 01 due to the arrangement of the bit values at the difference bit position in the comparison key string.

Also, 2, which is the difference bit position between the insert key string and comparison key string, is stored in the discrimination bit position of the branch node 1210*b*, the array element number 1220*d* of the array element holding the primary node 1210*d* of the node group 1201*d* is stored in its coupled node indicator, and the tree becomes the coupled node tree with the configuration shown in FIG. 12B.

Figure 12C:
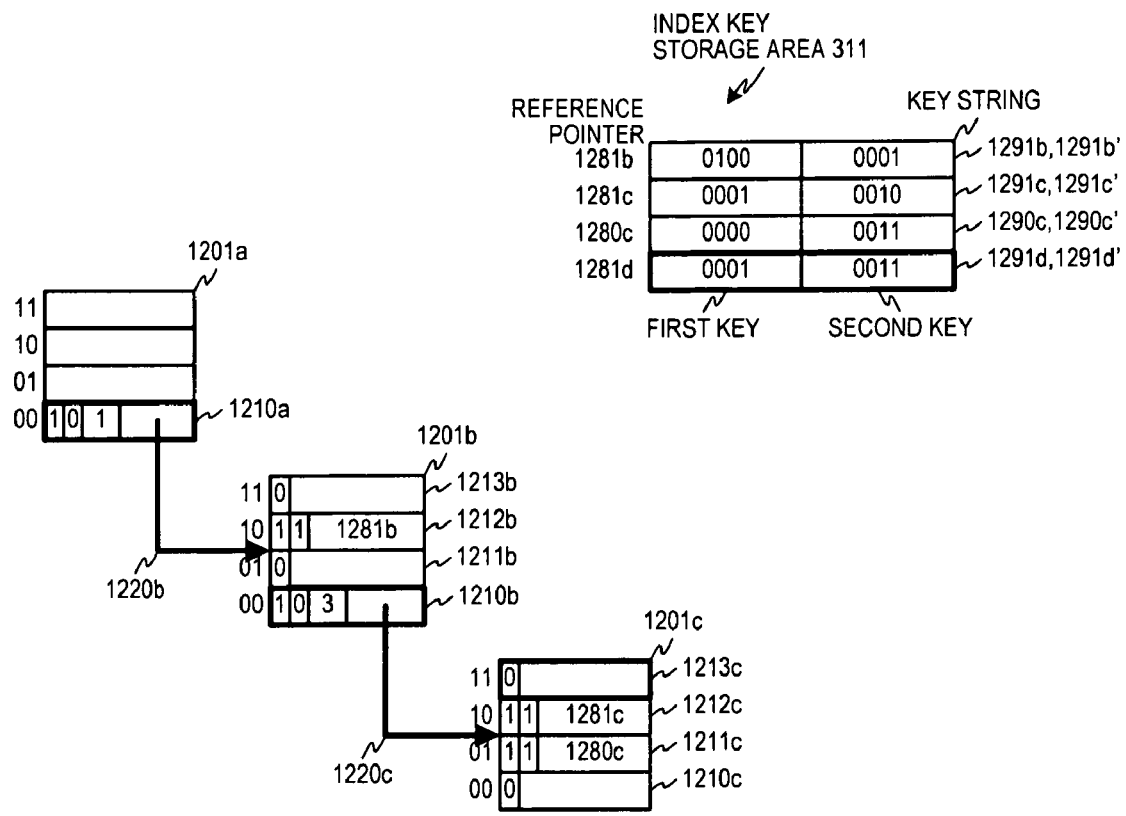
FIG. 12C is a drawing showing an example of a coupled node tree before insert processing in a second concrete example.
Figure 12D:
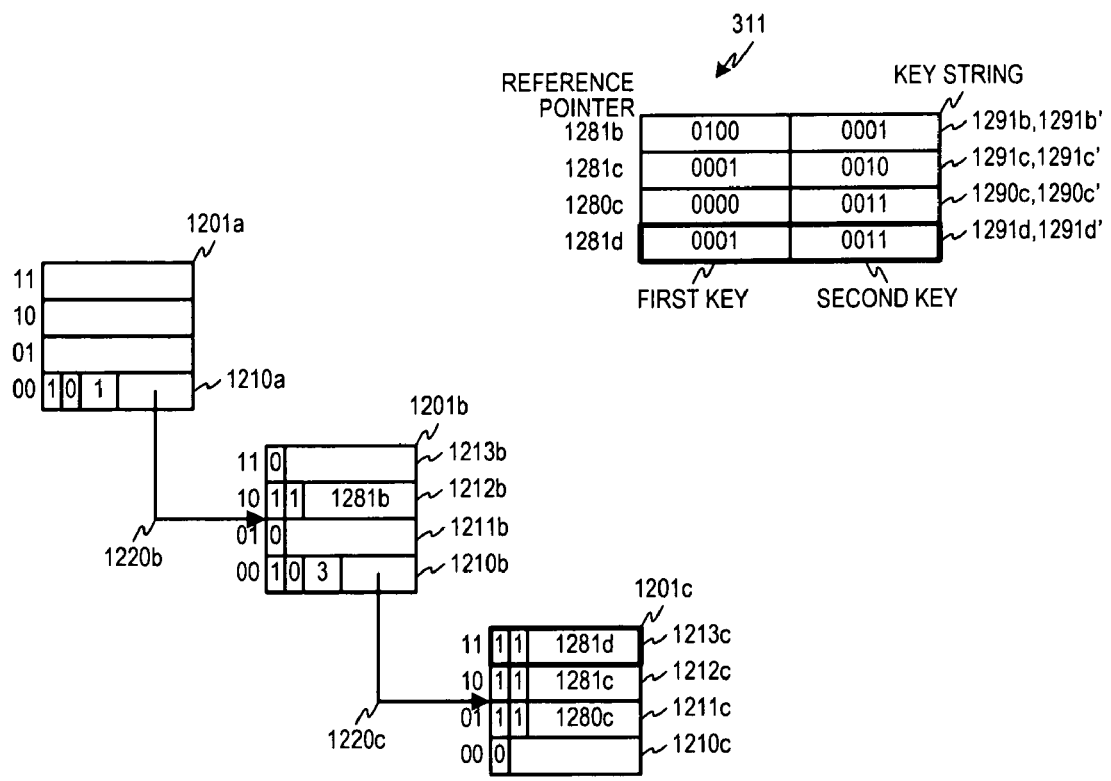
FIG. 12D is a drawing showing an example of a coupled node tree after insert processing in the second concrete example.

FIG. 12C and FIG. 12D are drawings describing concrete example 2 of insert processing.

Concrete example 2 is the case wherein the determination in step S510*b* shown in FIG. 5 is that the node status indicates that the node is empty. Although the coupled node tree before insert processing shown in FIG. 12C is the same as that in FIG. 12A, the drawing differs from that in 12A in that the insert key string stored in the index key storage area 311 is "0001:0011", and it is stored in the storage area pointed to by the reference pointer 1281*d*.

When a search is executed from the root node 1210*a* using the insert key string "0001:0011", the empty node 1213*c* is reached via the branch node 1210*b*. There, a "1" is stored in the node status of the node 1213*c*, indicating in-use, a "1" is stored in its node type, indicating leaf node, and the reference pointer 1281*d* for the insert key string "0001:0011" is stored in its reference pointer. By means of the above processing, the coupled node tree after insert shown in FIG. 12D is obtained.

Figure 13:
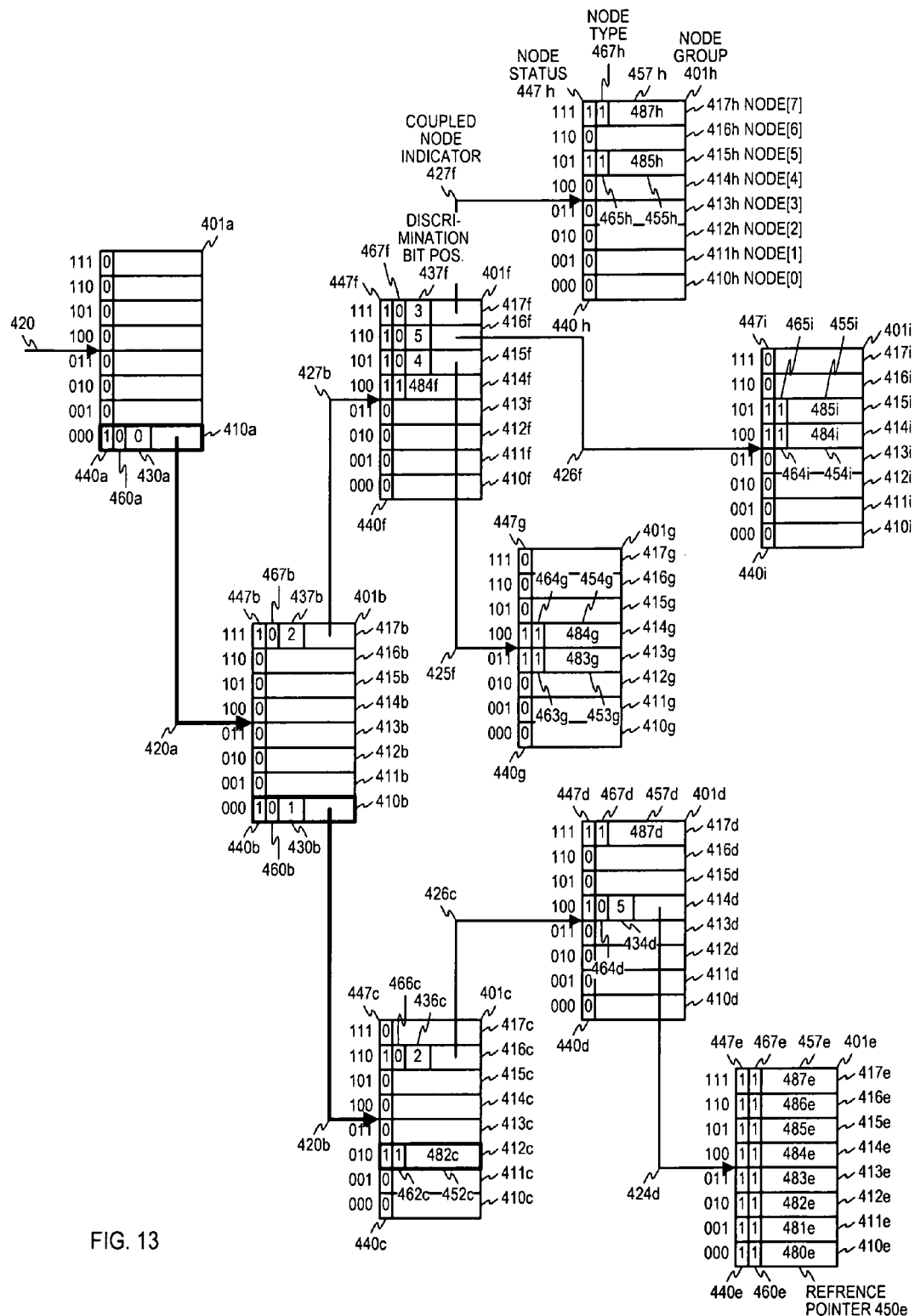
FIG. 13 is a drawing showing conceptually the tree configuration of a triple coupled node tree stored in an array.

FIG. 13 is a drawing showing conceptually the tree configuration of a coupled node tree related to a preferred embodiment of this invention using search processing with a key string formed from 3 keys. The key string is called a 3 dimension key in this preferred embodiment and the coupled node tree is called a triple coupled node tree.

The search using a triple coupled node tree is the same as that described above for a double coupled node tree, and the link targets are determined by the arrangements of the bit values at the discrimination bit position of the keys composing the 3 dimension key. The node group consists of 2 raised to the third power entries, that is, 8 entries. The node positions are expressed with 3 bits from 000 to 111.

The root node is shown with the reference tag 410*a*. In the illustrated example root node 410*a* is the primary node of node group 401*a* located in array element number 420.

As a tree configuration, node group 401*b* is located below root node 410*a*, in the level below that the node groups 401*c* and 401*f* are located and in the level below node group 401*f* are located node groups 401*g*, 401*h*, and 401*i*. Below node group 401*c* is node group 401*d* and below that node group is node group 401*e*.

The three-bit reference codes affixed before each node indicates the node position. The tree is traversed in accordance with the bit values at the discrimination bit position in each key of the search key string, and finding a leaf node corresponding to the index key that is the object of the search is the same as in the case for a double coupled node tree.

In the illustrated example, the node status 440*a* of the root node 410*a* is a 1 and its node type 460*a* is a 0, indicating that the root node 410*a* is a branch node, and its discrimination bit position 430*a* expresses a 0. Its coupled node indicator is 420*a*, that is the array element number of the array element holding the primary node 410*b* of node group 401*b*.

Node group 401*b* is composed of nodes 410*b*, 411*b*, 412*b*, 413*b*, 414*b*, 415*b*, 416*b*, and 417*b*. Only the node status 447*b* of the primary node 410*b* and of node 417*b* with the node position 111 are a 1, indicating "in-use", and all the other nodes are empty nodes. The node type 460*b* of node 410*b* and the node type 467*b* of node 417 are both 0, indicating that they are branch nodes.

A 1 is stored in the discrimination bit position 430*b* of node 410*b* and the array element number 420*b* of the array element holding the primary node 410*c* of the node group 401*c* is stored in the coupled node indicator that points to the primary node as the link target. A 2 is stored in the discrimination bit position 437*b* of node 417*b* and the array element number 427*b* of the array element holding the primary node 410*f* of the node group 401*f* is stored in the coupled node indicator that points to the primary node as the link target.

The nodes that are "in-use" in the node group 401*c* whose primary node 410*c* is the link target of branch node 410*b* are node 412*c* with bit position 010 and node 416*c* with bit position 110. The node type 462*c* of node 412*c* is a 1, indicating a leaf node, and the pointer 482*c* to the storage area holding the index key is stored in its reference pointer 452*c*. The node type 466*c* of node 416*c* is a 0, indicating a branch node, a 2 is stored in its discrimination bit position 436*c*, and the array element number 426*c* of the array element holding the primary node 410*d* of node group 401*d* is stored in its coupled node indicator.

The nodes that are "in-use" in the node group 401*d* whose primary node 410*d* is the link target of branch node 416*c* are node 414*d* with bit position 100 and node 417*d* with bit position 111. The node type 464*d* of node 414*d* is a 0, indicating a branch node, a 5 is stored in its discrimination bit position 434*d*, and the array element number 424*d* of the array element holding the primary node 410*e* of node group 401*e* is stored in its coupled node indicator. The node type 467*d* of node 417*d* is a 1, indicating a leaf node, and the pointer 487*d* to the storage area holding the index key is stored in its reference pointer 457*d*.

All of the nodes 410*e* to 417*e* in node group 401*e*, which holds the primary node 410*e* that is the link target of branch node 414*d*, have a 1 in their nodes statuses 440*e* to 447*e*, and a 1 in their node types 460*e* to 467*e*, respectively, indicating that they are leaf nodes, and their reference pointers 450e to 457e hold the pointers 480e to 487e to the storage areas holding their index keys.

The nodes 410f to 413f in the node group 401f, which holds the primary node 410f that is the link target of branch node 417b, have a 0 in the node statuses as shown by the node status 440f for node 410f, indicating that they are empty nodes. Node 414f is a leaf node, and node 415f to 417f are branch nodes. The reference pointer for node 414f holds the pointer 484f to the storage area holding its index key. The discrimination bit position of branch node 415f has a 4, and its coupled node indicator holds the array element number 425f of the array element holding the primary node 410g of the node group 401g. The discrimination bit position of branch node 416f has a 5, and its coupled node indicator holds the array element number 426f of the array element holding the primary node 410i of the node group 401i. The discrimination bit position of branch node 417f has a 3, and its coupled node indicator holds the array element number 427f of the array element holding the primary node 410h of the node group 401h.

The only "in-use" nodes in node group 401g whose primary node 410g is the link target of branch node 415f are node 413g with the node position 011 and node 414g with the node position 100. The node type 463g of node 413g and the node type 464g of node 414g are both 1, indicating that both nodes are leaf nodes. The pointers 483g and 484g referencing the storage areas holding their index keys are stored in the reference pointers 453g and 454g respectively.

The only "in-use" nodes in node group 401i whose primary node 410i is the link target of branch node 416f are node 414i with the node position 100 and node 415i with the node position 101. The node type 464i of node 414i and the node type 465i of node 415i are both 1, indicating that both nodes are leaf nodes. The pointers 484i and 485i referencing the storage areas holding the index keys are stored in the reference pointers 454i and 455i respectively.

The only "in-use" nodes in node group 401h whose primary node 410h is the link target of branch node 417f are node 415h with the node position 101 and node 417h with the node position 111. The node type 465h of node 415h and the node type 467h of node 417h are both 1, indicating that both nodes are leaf nodes. The pointers 485h and 487h referencing the storage areas holding the index keys are stored in the reference pointers 455h and 457h respectively.

Although, in FIG. 13, the index key (3 dimension key) referred to by the reference pointer in each leaf node is not notated, by paying attention to the discrimination bit positions and link target node positions from the root node to the leaf node notated in FIG. 13, a decision can be made as to the range of values in the index keys.

For example, when considering a 3 dimension key references by the reference pointer 482c in leaf node 412c, because the discrimination bit position 430a of the root node 410a is 0, and the node position in the branch node 410b on the link path is 000, the bit 0 of each of the dimension keys is 0, while because the discrimination bit position 430b of the branch node 410b is 1, and the node position of the leaf node 412c that is the link target is 010, the bit value at the bit 1 in each of the keys is 0 in the first key, 1 in the second key, and 0 in the third key. In other words the 3 dimension key references by the reference pointer 482c in leaf node 412c has the value of "00xxxx:01xxxx:00xxxx" (where x represents a value of either 0 or 1).

The 3 dimension keys related to other leaf nodes can be obtained from the configuration of the tree in the same way.

Also, it will be clear to a person skilled in the art that search processing, insert processing, and delete processing using a triple coupled node tree can be executed in the same way as the search processing, insert processing, and delete processing using a double coupled node tree.

Furthermore it is clear that searches can be expanded beyond 2 or 3 dimensions in accordance with this invention by using higher dimension multiple dimension keys and increasing the number of bits for the node position in accordance with the number of dimensions.

Although the foregoing is a detailed description of a preferred mode of embodying the present invention, the embodiments of the present invention are not limited in this manner, and it will be clear to a person skilled in the art that a variety of modifications thereof are possible. For example, it will be clear to a person skilled in the art that a leaf node can hold the index key itself rather than information pointing to a position in a storage area holding the index key.

Also, it will be understood that the bit string search apparatus of the present invention can be implemented in a computer by a storage means for storing the coupled node tree and a program that the computer is caused to execute to perform the processing shown in FIG. 4.

Additionally, it is clear that it is possible to embody an index insert method according to the present invention by a program that a computer is caused to execute to perform the index insert processing shown in FIG. 5 to FIG. 8 and its equivalents, and that it is possible to embody an index delete method according to the present invention by a program that a computer is caused to execute to perform the index delete processing shown in FIG. 9A, FIG. 9B, and FIG. 10 and its equivalents. Also, it is possible by means of these programs to embody in a computer a method for identifying a branch node and a leaf node and a method for linking to one node of a node group of a link target in response to the discrimination bit position of the branch node.

Therefore, the above-noted programs, and a computer-readable storage medium into which the programs are stored, are encompassed by the embodiments of the present invention. Additionally, the data structure of the coupled node tree according to the present invention is encompassed by the embodiments of the present invention.

By using a novel data configuration that is a coupled node tree provided by the present invention, it is possible to handle multiple dimension keys as well as performing searching of bit strings at higher speeds, and also to easily perform additions and deletes of bit string data.

What is claimed is:

1. A bit string search apparatus, comprising:
a tangible non-transitory computer readable data storage apparatus having a coupled node tree stored therein, the coupled node tree being used in a bit string search and comprises a root node and in layers below that root node, node groups formed from four or more nodes in adjacent storage areas, the nodes being a collection of branch nodes, leaf nodes, or empty nodes, wherein
the root node is a node that expresses a starting point of the tree and which is a leaf node when there is one node in the tree and a branch node when there are two or more nodes in the tree, and
the branch node includes a first position information indicating a position of a primary node which is one node of a node group of a link target, and
the leaf node includes an index key composed of a bit string that is the target of a search or a second position information indicating a storage area holding the index key, and the empty node includes information expressing that that node is in an empty status, the index key being a key string formed of two or more keys, and the branch node also including a discrimination bit position for a key of a search key string for performing a bit string search;

a data processing apparatus configured to repeat a linkage, at the branch node, to one node located in one node position of a link target node group to which the primary node belongs from an arbitrary node other than an empty node of the coupled node tree as a search start node, in accordance with bit values of keys of the search key string at the discrimination bit position included in the branch node; and wherein, if a leaf node is reached, the index key stored in a storage area indicated by the second position information included in the leaf node or the index key stored in the leaf node is made the search result key string of a search, using the search key string, of an arbitrary subtree of the coupled node tree that has the search start node as its root node or if an empty node is reached, the empty node is made the search result empty node of a search, using the search key string, of an arbitrary subtree of the coupled node tree that has the search start node as its root node.

2. A bit string search apparatus according to claim 1, further comprising: an array, wherein the coupled node tree is stored in the array and the first position information is an array element number of an array element of the array in which the primary node corresponding to the first position information is stored.

3. A bit string search apparatus according to claim 2, further comprising: a stack, wherein the array element number of the array element storing the search start node and the array element numbers of array elements storing the nodes that are the link targets from the search start node to a leaf node are successively stored in the stack.

4. A bit string search method, wherein the bit string search apparatus according to claim 1 searches the index keys based on the coupled node tree data structure, comprising:

repeating linkage, at the branch node, to one node located in one node position of a link target node group to which the primary node belongs from an arbitrary node other than an empty node of the coupled node tree as a search start node, in accordance with bit values of keys of the search key string at the discrimination bit position included in the branch node; and if a leaf node is reached, the index key stored in a storage area indicated by the second position information included in the leaf node or the index key stored in the leaf node being made the search result key string of a search, using the search key string, of an arbitrary subtree of the coupled node tree that has the search start node as its root node or if an empty node is reached, the empty node being made the search result empty node of a search, using the search key string, of an arbitrary subtree of the coupled node tree that has the search start node as its root node.

5. A bit string search method according to claim 4, wherein the coupled node tree is stored in an array, and the first position information is an array element number of an array element of the array in which the primary node corresponding to the first position information is stored.

6. A bit string search method according to claim 5, wherein the array element number of the array element holding the search start node and the array element numbers of array elements holding the nodes that are the link targets from the search start node to a leaf node are successively stored in a stack.

7. A leaf node insert method that inserts, in a coupled node tree using the bit string search method according to claim 4, a leaf node including a new index key or including a second position information indicating the position in a storage area holding that index key, which method comprises:

a search step that performs the bit string search method according to claim 4 while storing the link path from the root node to a leaf node or an empty node using the new index key as the search key string and the root node of the coupled node tree as the search start node;

if an empty search result node is obtained in the search step,
a step that inserts a leaf node by writing the contents of the leaf node to be inserted into the search result empty node;

if a search result key string is obtained in the search step,
a difference position acquiring step that acquires a difference position, which is a smallest value of bit positions that form first differing bit positions derived by comparing the bit values of each of the keys in the search key string and the search result key string;

an insert position determining step that determines an insert position of a node group that includes the leaf node to be inserted by relative position relationship between the discrimination bit positions of the branch nodes on the link path and the difference bit position acquired in the difference position acquiring step;

a node position determining step that determines, by the combination of bit values of the keys of the search key string at the difference bit position, in which node position of the node group that includes the leaf node to be inserted the leaf node is located; and a step that generates a leaf node by storing in the leaf node the new index key or the information that indicates as second position information the position in a storage area holding the new index key.

8. A leaf node insert method according to claim 7, wherein the coupled node tree is stored in an array, and the first position information is an array element number of an array element of the array in which the primary node corresponding to the first position information is stored.

9. A leaf node insert method according to claim 8, wherein the array element number of the array element holding the search start node and the array element numbers of array elements holding the nodes that are the link targets from the search start node to a leaf node are successively stored in a stack.

10. A computer readable storage medium storing a program for execution by a computer of the leaf node insert method according to claim 7.

11. A leaf node delete method that deletes, from the coupled node tree used in the bit string search method according to claim 4, a leaf node including a specified index key or a second position information that indicates the position of a storage area holding the specified index key as an object leaf node of delete, which method comprises:

a search result key being acquired by the bit string search method, using the specified index key as the search key string and the root node of the coupled node tree as the search start node;

a determination being made whether three or more non-empty nodes are located in the same node group as the object leaf node of delete that holds the search result key string as its index key or a second position information that indicates the position of a storage area holding the index key;

if three or more nodes are located in the same node group, by making the object leaf node of delete as an empty node, the leaf node being deleted; and if two nodes are located in the same node group, the node that is not the object leaf node of delete being stored in the branch node that is the link source of the object leaf node of delete, and by deleting the node group wherein the object leaf node of delete is located, the object leaf node of delete being deleted.

12. A leaf node delete method according to claim 11, wherein the coupled node tree is stored in an array, and the first position information is an array element number of an array element of the array in which the primary node corresponding to the first position information is stored.

13. A leaf node delete method according to claim 12, wherein the array element number of the array element holding the search start node and the array element numbers of array elements holding the nodes that are the link targets from the search start node to a leaf node are successively stored in a stack.

14. A computer readable storage medium storing a program for execution by a computer of the leaf need delete method according to claim 11.

15. A computer readable storage medium storing a program for execution by a computer of the bit string search method according to claim 4.

16. A computer readable storage medium storing data in the tree data structure for use in bit string searches comprising:

a coupled node tree which comprises a root node and in the layers below that root, node groups formed from four or more nodes in adjacent storage areas, the nodes being a collection of branch nodes, leaf nodes, or empty nodes, wherein the root node is a node that expresses a starting point of the tree and which is a leaf node when there is one node in the tree and a branch node when there are two or more nodes in the tree, and the branch node includes a first position information indicating a position of a primary node which is one node of a node group of a link target, and the leaf node includes the index key composed of a bit string that is the target of a search or a second position information indicating a storage position holding the index key, and the empty node includes information expressing that that node is in an empty status, the index key being a key string formed of two or more keys, and the branch node also including a discrimination bit position for a key of a search key string for performing a bit string search; and wherein with an arbitrary node other than an empty node of the coupled node tree as a search start node, at the branch node, a search is enabled using a search key by repeatedly and successively linking to one node of a link target node group to which the primary node belongs, in accordance with bit values of keys of the search key string at the discrimination bit position included in the branch node, and if a leaf node is reached, the index key stored in a storage area indicated by the second position information included in the leaf node or the index key stored in the leaf node is made the search result key string of a search, using the search key string, of an arbitrary subtree of the coupled node tree that has the search start node as its root node and if an empty node is reached, the empty node is made the search result empty node of a search, using the search key string, of an arbitrary subtree of the coupled node tree that has the search start node as its root node.

* * * * *